United States Patent
Wada et al.

(10) Patent No.: US 6,532,202 B1
(45) Date of Patent: Mar. 11, 2003

(54) OPTICAL ELEMENT, OPTICAL HEAD AND OPTICAL RECORDING REPRODUCING APPARATUS

(75) Inventors: Hidenori Wada, Uji (JP); Shin-ichi Kadowaki, Sanda (JP); Hiroaki Yamamoto, Kawabe-gun (JP); Tetsuo Saimi, Hirakata (JP); Daisuke Ogata, Amagasaki (JP); Naoya Hotta, Sagamihara (JP); Sadao Mizuno, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 42 days.

(21) Appl. No.: 09/611,575

(22) Filed: Jul. 7, 2000

(30) Foreign Application Priority Data

Jul. 7, 1999 (JP) .......................................... 11-192762
Jul. 28, 1999 (JP) .......................................... 11-213278

(51) Int. Cl.$^7$ .................................................. G11B 7/00
(52) U.S. Cl. ................................ 369/112.02; 369/44.23
(58) Field of Search ........................ 369/112.02, 44.23, 369/44.32, 112.17, 112.19, 112.21, 53.19

(56) References Cited

U.S. PATENT DOCUMENTS

| 5,513,158 A | 4/1996 | Ohsato |
| 5,515,348 A | 5/1996 | Ohasato |
| 5,748,599 A | 5/1998 | Yamamoto et al. |
| 5,757,754 A | 5/1998 | Yamamoto et al. |
| 5,936,923 A | 8/1999 | Ootaki et al. |
| 6,125,088 A * | 9/2000 | Ogasawara ............. 369/112.02 |
| 6,141,304 A * | 10/2000 | Ogasawara ............. 369/112.02 |
| 6,370,095 B1 * | 4/2002 | Ogasawara ............. 369/112.02 |

FOREIGN PATENT DOCUMENTS

| EP | 0 545 133 A1 | 9/1993 |
| EP | 0 745 980 A1 | 4/1996 |
| JP | 63-314502 | 12/1988 |
| JP | 5-144056 | 6/1993 |
| JP | 8-77578 | 3/1996 |
| JP | 9-128785 | 5/1997 |
| JP | 10-247 330 | 9/1998 |
| JP | 11-110802 | 4/1999 |

* cited by examiner

Primary Examiner—Thang V. Tran
(74) Attorney, Agent, or Firm—RatnerPrestia

(57) ABSTRACT

An optical element has a phase change layer for changing the phase of light passing therethrough; a plurality of aberration correcting electrodes, arranged on one side of said phase change layer, for correcting optical aberrations, each of said aberration correcting electrodes being split into a plurality of regions; an insulating film interposed between said aberration correcting electrodes; and a specific electrode arranged on the other side of said phase change layer, and wherein: said aberration correcting electrodes, at least other than the outermost aberration correcting electrode as viewed from said phase change layer, have openings formed in prescribed positions, and each of said aberration correcting electrodes, other than the innermost aberration correcting electrode, faces said phase change layer through said openings formed in other aberration correcting electrodes.

31 Claims, 27 Drawing Sheets

RADIAL DIRECTION

RADIAL DIRECTION

Fig. 9
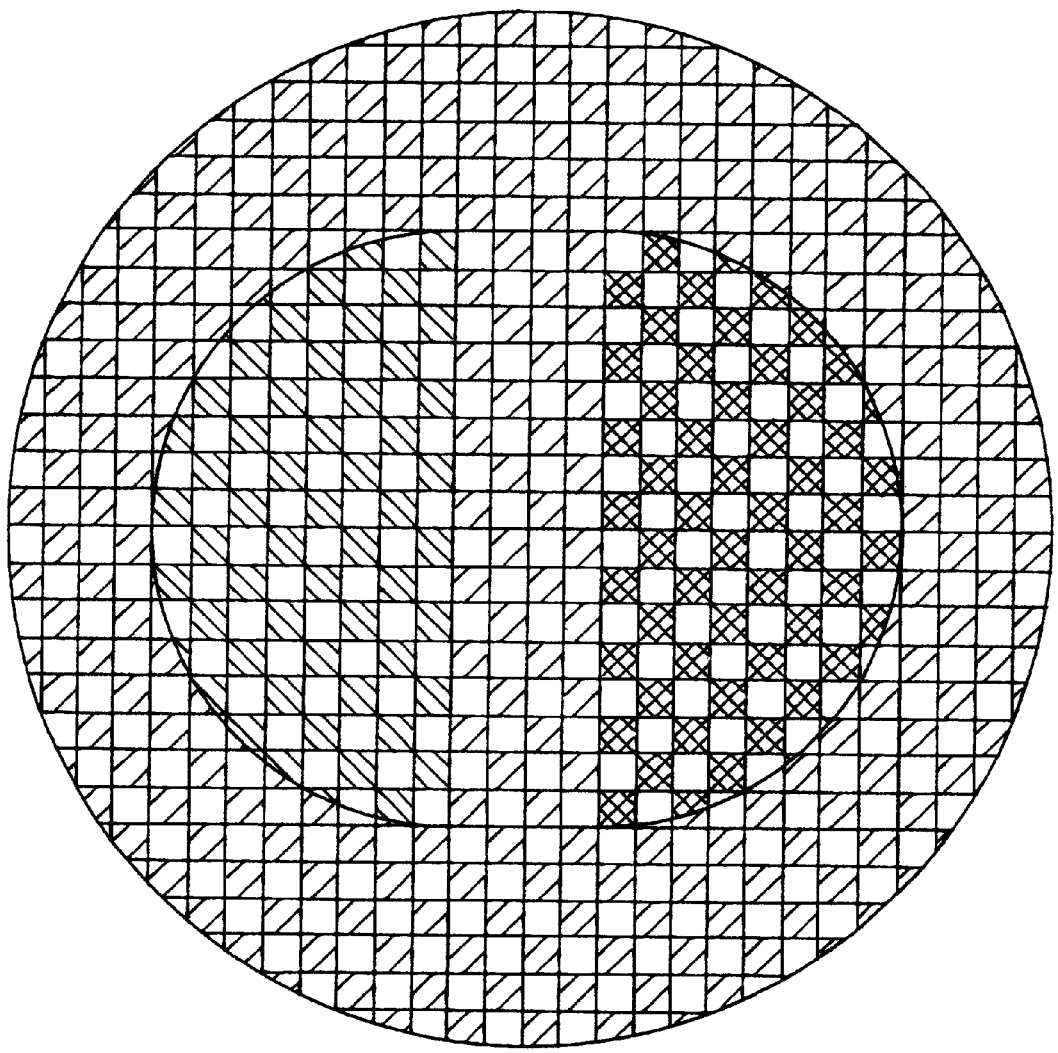
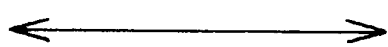
RADIAL DIRECTION

| | 0.08~0.12 |
| | 0.04~0.08 |
| | 0~0.04 |
| | -0.04~0 |
| | -0.08~-0.04 |

UNIT [rad]

PATTERN OF RADIAL TILT CORRECTING TRANSPARENT ELECTRODE

RADIAL DIRECTION

TANGENTIAL DIRECTION

PATTERN OF TANGENTIAL TILT CORRECTING TRANSPARENT ELECTRODE

RADIAL DIRECTION

TANGENTIAL DIRECTION

OPTICAL ELEMENT, OPTICAL HEAD AND OPTICAL RECORDING REPRODUCING APPARATUS

BACKGROUND OF THE INVENTION

1. Field of the Invention

The present invention relates to an optical element used in optical information processing or optical communications or the like to correct aberrations, and also relates to an optical head and an optical recording/reproduction apparatus.

2. Related Art of the Invention

In recent years, the Digital Versatile Disc (DVD) has been attracting attention as a large capacity optical recording medium since it can record digital information at a recording density about seven times higher than the Compact Disc (CD).

In order to play back high density DVDs, the wavelength of the light source is made shorter than that for the CD (650 nm for DVD compared with 780 nm for CD), and the numerical aperture of the objective lens is made larger than that for the CD (0.6 for DVD compared with 0.45 for CD).

However, since the wavelength is made shorter and the lens NA is increased, as described above, wavefront aberration, especially coma, is generated because of the displacement (tilt) from the normal relative to the optical axis caused by warping or other irregularities of the optical disc, and thus the margin for tilt is smaller than in the case of CD.

To overcome this problem, an optical head which corrects wavefront aberration by using a liquid crystal panel is proposed in Japanese Laid-open No. 9-128785. However, the optical head described in the above cited patent publication can only correct one kind of aberration, for example, the coma caused by radial tilt.

Actual optical discs, however, may become warped in both radial and tangential directions, depending on the manufacturing method used, and the optical head described in the above cited patent publication cannot provide a sufficient correction effect. In view of this problem, an optical head which simultaneously corrects for the radial and tangential directions is proposed in Japanese Laid-open No. 10-247330.

One example of the above prior art optical head will be described with reference to drawings. FIG. 20 is a diagram showing the construction of an optical head (also called an optical pickup) according to the prior art. As shown in the figure, the optical head comprises a light source 170, a half-silvered mirror 171, a liquid crystal panel 172, an objective lens 173, an optical disc 174, a converging lens 175, a photodetector 176, a first tilt sensor 177, a second tilt sensor 178, and a liquid crystal panel control circuit 179.

The light source 170 is constructed, for example, from a semiconductor laser device, and outputs recording/playback coherent light directed to a recording layer of the optical disc 174. The half-silvered mirror 171 is a device for separating light; the liquid crystal panel 172 is a device that has the structure shown in FIG. 21 and the pattern shown in FIG. 22, and that corrects aberrations by applying a desired voltage to each electrode and thereby changing the refractive index of the liquid crystal and, hence, the phase of each electrode (the details will be described later); the objective lens 173 is a lens for focusing the light onto the recording layer of the optical disc 174; the converging lens 175 is a lens for focusing the light, reflected from the recording layer of the optical disc 174, onto the photodetector 176; the photodetector 176 is a device that receives the light reflected from the recording layer of the optical disc, and converts the light into an electrical signal; the first tilt sensor 177 is a sensor which detects the radial tilt angle of the optical disc 174, and generates a signal proportional to the detected tilt angle; the second tilt sensor 178 is a sensor which detects the tangential tilt angle of the optical disc 174, and generates a signal proportional to the detected tilt angle; and the liquid crystal panel control circuit 179 is a circuit that generates two signals, one for controlling each electrode of the liquid crystal panel according to the signal generated by the first tilt sensor 177 and the other for controlling each electrode of the liquid crystal panel according to the signal generated by the second tilt sensor 178.

The operation of the thus constructed optical head will be described below. Linearly polarized light emitted from the light source 170 is reflected by the half-silvered mirror 171, and the light thus redirected in the direction of the optical disc 174 enters the liquid crystal panel 172. Suppose here that the optical disc 174 is rotating with the disc tilted from the normal in the radial direction relative to the optical axis; then, the first tilt sensor 177 outputs a signal proportional to the amount of the tilt (the radial tilt angle), and the signal is input to the liquid crystal panel control circuit 179. The liquid crystal panel control circuit 179 then outputs the necessary signal to each electrode portion of the pattern shown in FIG. 22 of the radial tilt correcting electrode shown in FIG. 21 to generate a wavefront aberration that compensates for the wavefront aberration caused when the optical disc 174 is tilted in the radial direction, and this signal is input to the liquid crystal panel 172.

If, at the same time, the optical disc 174 is tilted from the normal in the tangential direction relative to the optical axis, the second tilt sensor 178 outputs a signal proportional to the amount of the tilt (the tangential tilt angle), and the signal is input to the liquid crystal panel control circuit 179; the liquid crystal panel control circuit 179 then outputs the necessary signal to each electrode portion of the pattern shown in FIG. 22 of the tangential tilt correcting electrode shown in FIG. 21 to generate a wavefront aberration that compensates for the wavefront aberration caused when the optical disc 174 is tilted in the tangential direction, and this signal is input to the liquid crystal panel 172.

As a result, the light entering the liquid crystal panel 172, as it passes through the liquid crystal panel 172, is given such wavefront aberrations that compensate for the wavefront aberrations caused when the optical disc is tilted in both the radial and tangential directions. The light passed through the liquid crystal panel 172 is then focused onto the optical disc 174 by means of the objective lens 173.

Since the light having wavefront aberrations that compensate for the wavefront aberrations caused when the optical disc 174 is tilted is focused through the objective lens, a light spot free from aberrations and thus focused to the diffraction limit is formed on the optical disc. Next, the light reflected from the optical disc 174 emerges with wavefront aberrations proportional to the tilt of the optical disc 174, but these wavefront aberrations are corrected by the liquid crystal panel 172.

The light passed through the liquid crystal panel 172 is not directed back to the light source 170, but is passed through the half-silvered mirror 171 and directed to the converging lens 175 which focuses the light onto the photodetector 176. The photodetector 176 outputs a focus error signal indicating the focusing condition of the light on the optical disc 174, and also outputs a tracking error signal indicating the position of the light shone thereon.

One of these signals is supplied to focus control means not shown and, based on the focus error signal, the focus control means controls the position of the objective lens 173 along its optical axis so that the light is always kept in focus on the optical disc 174.

On the other hand, tracking control means not shown controls the position of the objective lens 173 based on the tracking error signal so that the light is kept focused on the desired track on the optical disc 174. The photodetector 176 also reproduces information recorded on the optical disc 174.

The operating principles of the liquid crystal panel 172 and tilt corrections will be described in detail below. First, FIG. 23 shows the wavefront aberration distribution on the recording surface of the optical disc 174 at the best focal point when the radial tilt angle of the optical disc is 1 degree, the NA of the objective lens is 0.6, and the substrate thickness of the optical disc 174 is 0.6 mm.

Here, if a phase that would perfectly correct for this distribution is given to the light, the light spot on the optical disc will be focused to the diffraction limit even when the optical disc is tilted. The wavefront aberration distribution in the case of tangential tilt will be given by rotating through 90 degrees the wavefront aberration distribution obtained when radial tilt exists. In that case also, a phase that would perfectly correct for this distribution should be given.

Next, a method of correcting for the wavefront aberration distribution of FIG. 23 will be described. When the optical disc is tilted, there occurs a phase distribution such as shown in FIG. 23, and then such phase distribution that can cancel the phase distribution shown in FIG. 23 should be given to the light. That is, the optical path length should be selectively changed.

Since the liquid crystal is capable of varying its refractive index in accordance with an externally applied voltage, the optical path length can be selectively changed by applying an external voltage. That is, the liquid crystal exhibits the property called birefringence in which the refractive index differs between the alignment direction of the liquid crystal and the direction normal to it, as shown in FIG. 32.

Accordingly, by forming the pattern shown in FIG. 22 and by applying the necessary voltage to each region, the phase distribution shown in FIG. 23 can be perfectly corrected.

To make the above correction possible, the liquid crystal panel has the structure shown in FIG. 21. In FIG. 21, reference numeral 180 is first glass, 181 is a radial tilt correcting transparent electrode, 182 is a radial tilt correcting liquid crystal, 183 is a common transparent electrode, 184 is second glass, 185 is a tangential tilt correcting liquid crystal, 186 is a tangential tilt correcting transparent electrode, and 187 is third glass.

Next, the tilt correcting method will be described with reference to the structural diagram of FIG. 21. First, to correct for radial tilt, a prescribed voltage is applied to the uniformly formed common transparent electrode 183 (the voltage applied here is AC and its rms value is expressed by V), and different voltages are applied to the respective regions of the radial tilt correcting transparent electrode, generating different electric fields between the common transparent electrode 183 and the respective regions, thereby selectively changing the refractive index of the radial tilt correcting liquid crystal 182 and thus selectively changing the phase to correct for the radial tilt.

Next, to correct for tangential tilt, a prescribed voltage is applied to the uniformly formed common transparent electrode 183 (the voltage applied here is AC and its rms value is expressed by V), and different voltages are applied to the respective regions of the tangential tilt correcting transparent electrode 186, generating different electric fields between the common electrode and the respective regions, thereby selectively changing the refractive index of the tangential tilt correcting liquid crystal 185 and thus selectively changing the phase to correct for the tangential tilt.

When simultaneously correcting for the radial and tangential tilts, a prescribed voltage is applied to the uniformly formed common transparent electrode 183 (the voltage applied here is AC and its rms value is expressed by V), and voltages are applied to the respective regions of the radial tilt correcting transparent electrode, generating different electric fields between the common transparent electrode 183 and the respective regions, thereby selectively changing the refractive index of the radial tilt correcting liquid crystal 182 and thus selectively changing the phase from to correct for the radial tilt, while at the same time, voltages are applied to the respective regions of the tangential tilt correcting transparent electrode 186, generating different electric fields between the common electrode and the respective regions, thereby selectively changing the refractive index of the tangential tilt correcting liquid crystal 185 and thus selectively changing the phase to correct for the tangential tilt.

In the optical head of the above construction, however, since the tilt correcting liquid crystal panel requires three glass sheets and two different liquid crystal layers to correct for radial and tangential tilts, respectively, the thickness of the liquid crystal panel increases, making it difficult to make the optical head compact and thin in construction and increases the cost.

Furthermore, the center of the radial tilt correcting transparent electrode and the center of the tangential tilt correcting transparent electrode must be aligned with respect to each other, but since the two electrodes are separated by a glass sheet increasing the distance between the patterns to be aligned, it is difficult to align the patterns with each other and pattern displacements tend to occur, resulting in the degradation of the aberration correcting effect.

The prior art optical head has a further problem as described below.

The optical head described in the prior art is constructed using nonpolarizing optics, so that the polarization direction of the linearly polarized light emitted from the light source remains unchanged until it reaches the photodetector.

Accordingly, when the alignment direction of the liquid crystal in the liquid crystal panel is made to coincide with the polarization direction, if the optical recording medium is tilted from the normal in the radial direction relative to the optical axis, causing the phase distribution shown in FIG. 17 to occur at the best focal plane, the light spot focused on the recording surface of the optical recording medium and the light spot on the photodetector are substantially free from aberrations and stable servo signals and information can be obtained, since the light entering the liquid crystal panel is given the opposite phase distribution by external signals.

Here, for example, when the output of the light source is low or the reflectivity of the optical recording medium is low, or when the light transmitting efficiency of the optics is low, or when the light output on the optical recording medium has to be held low, such as when reading signals from an information erasable optical recording medium, the efficiency of light utilization decreases and the signal to noise ratio (S/N ratio) degrades. In view of this, recent optical heads employ polarizing optics to improve the efficiency of light utilization.

However, in a polarizing optical head using the liquid crystal panel having the above-described structure, since the liquid crystal panel is arranged so that the polarization direction of the linearly polarized light emitted from the light source coincides with the alignment direction of the liquid crystal, the aberration occurring in the forward path (the optical path from the light source to the optical recording medium) can be corrected, but the linearly polarized light in the return path (the optical path from the optical recording medium to the photodetector) is polarized at right angles to the light in the forward path.

Accordingly, if an external signal is applied to the liquid crystal panel, the refractive index does not change and the phase of the light remains unchanged. As a result, the aberration occurring in the return path cannot be corrected, and an offset occurs in the servo signal.

For the prior art optical head, no description is given of a servo signal detection method; here, assuming that the well known SSD method which detects spot size, specifically, the focus detection method using the anisotropic polarizing hologram described in Japanese Laid-open No. 8-77578, is employed as the detection method, the reason that an offset occurs in the servo signal will be described in detail below. FIG. 33(a) shows how the light spot is formed on the photodetector when the light spot on the recording surface of the optical recording medium is maintained in the correctly focused state. The output value (focus error signal FE) of the photodetector, when expressed using the symbols assigned to the plurality of split regions of the photodetector shown in FIG. 33(a), can be obtained by calculating the following equation (1).

$$FE = (S1a - S1b - S1c) - (S1a' - S1b' - S1c') \quad \text{(Equation 1)}$$

FIG. 33(a) shows the light spot on the photodetector under ideal conditions, but the light spot shifts in the radial direction by an amount m, as shown in FIG. 33(b), for example, on account of adjustment/assembly errors or variations in wavelength due to temperature changes. In this case, when the amounts of light falling on the respective regions of the photodetector are compared, $S1a = S1a'$, $S1b = S1b'$, and $S1c = S1c'$, so that the focus error signal is zero (see equation 1). Further, when the optical recording medium contains a radial tilt angle, since the wavefront aberration is not corrected in the return path, as earlier described, the light spot on the photodetector will be as shown in FIG. 33(c).

Dotted lines show the sidelobes of the light spot due to coma. As for the sidelobes of the light spot due to the wavefront aberration, since a portion of the light spot is shifted outside the photodetector, when the amounts of light falling on the respective regions of the photodetector are compared $$S1a < S1a', \; S1b < S1b', \; S1c < S1c'$$

Hence, an offset occurs in the focus error signal.

SUMMARY OF THE INVENTION

Firstly, the present invention has been devised in view of the above-described problems of the prior art relating to the radial and tangential tilt corrections, and it is an object of the invention to provide an optical element that can correct a plurality of aberrations simultaneously, and that achieves a thin and low cost construction by reducing the number of glass sheets by forming the pattern of the liquid crystal panel on the same side of the glass, and by also reducing the number of liquid crystal layers to one.

Secondly, in order to solve the prior art problem associated with the above-described polarizing optics, it is an object of the invention to provide an optical element, etc. capable of correcting aberrations in the return path.

Thirdly, it is a second object of the invention to achieve a compact, thin, and low cost construction for an optical head having an increased tilt margin by using the optical element of the invention.

To achieve the above objects, the optical element of the present invention comprises: a first aberration correcting electrode split into a plurality of regions; a second aberration correcting electrode split into a plurality of regions; an insulating film interposed between the first aberration correcting electrode and the second aberration correcting electrode; a counter electrode arranged substantially parallel to the aberration correcting electrodes; and a phase change layer interposed between the first aberration correcting electrode and the counter electrode. In this optical element, the phase of incident light can be changed using the phase change layer. With the provision of the plurality of aberration correcting electrodes, the wavefront aberration associated with radial tilt of an optical recording medium and the wavefront aberration associated with tangential tilt, for example, can be corrected simultaneously by using one phase change layer. Thus, the above optical element not only is thin in construction, but also is capable of correcting a plurality of aberrations simultaneously.

Preferably, in the above optical element, insulating film and aberration correcting electrodes, each split into a plurality of regions, are formed in multilayer structures on top of the second aberration correcting electrode. In that case, three or more aberrations can be corrected simultaneously.

Preferably, in the above optical element, the insulating film is formed from a solgel film. This facilitates the fabrication of the optical element.

Preferably, in the above optical element, the insulating film is formed from a material having substantially the same refractive index as the aberration correcting electrodes. This serves to reduce refractions at the interface between the insulating film and each of the aberration correcting electrodes.

Preferably, in the above optical element, the insulating layer has a thickness equal to an integral multiple of $\lambda/(2 \times N(\text{insulating film}))$ (where $\lambda$ is the wavelength of light incident on the optical element, and $N(\text{insulating film})$ is the refractive index of the insulating film). In that case, refractions at the interface between the insulating film and each of the aberration correcting electrodes can be reduced, whatever material is used for the formation of the insulating film.

One aspect invention of the present invention is an optical element comprising:
 a phase change layer for changing the phase of light passing therethrough;
 a plurality of aberration correcting electrodes, arranged on one side of said phase change layer, for correcting optical aberrations, each of said aberration correcting electrodes being split into a plurality of regions;
 an insulating film interposed between said aberration correcting electrodes; and
 a specific electrode arranged on the other side of said phase change layer, and wherein:
  said aberration correcting electrodes, at least other than the outermost aberration correcting electrode as viewed from said phase change layer, have openings formed in prescribed positions, and each of said aberration correcting electrodes, other than the innermost aberration correcting electrode, faces said phase change layer through said openings formed in other aberration correcting electrodes.

In the above optical element, the phase of incident light can be changed using the phase change layer. Since the phase change layer is provided between the aberration correcting electrodes, the wavefront aberration associated with radial tilt of an optical recording medium and the wavefront aberration associated with tangential tilt, for example, can be corrected simultaneously by using one phase change layer. Thus, the above optical element not only is thin in construction, but also is capable of correcting a plurality of aberrations simultaneously.

Preferably, in the above optical element, the plurality of aberration correcting electrodes and the counter electrode are formed using the same electrically conductive material. This facilitates the fabrication of the optical element. Further preferably, the electrically conductive material is an Indium Tin Oxide alloy (ITO, Indium Tin Oxide). This serves to reduce light losses at electrode portions.

Preferably, in the above optical element, the refractive index of the phase change layer changes according to an externally applied signal. With this provision, the phase distribution of the incident light can be changed by applying an external signal, to effect aberration correction. If liquid crystal is used for the phase change layer, the magnitude of the external signal can be reduced.

Preferably, in the above optical element, the thickness of the phase change layer changes according to an externally applied signal. With this provision, the phase distribution of the incident light can be changed by applying an external signal, to effect aberration correction.

If PLZT (transparent crystal having a perovskite structure of lead oxide, lanthanum, zirconium oxide, and titanium oxide) is used for the phase change layer, the thickness of the optical element itself decreases further since the phase change layer is a solid.

Preferably, the above optical element further includes an antireflective film for preventing reflections of incident light. This serves to prevent light losses due to reflections.

The optical head of the present invention utilizes the above-described optical element of the invention. Accordingly, when reproducing or recording information on an optical recording medium by means of light, optical aberrations can be corrected accurately.

The optical recording/reproduction apparatus of the present invention utilizes the above-described optical head of the invention, and controls the optical head based on signals output from the optical head and reproduces or records information on an optical recording medium. According, information can be reliably reproduced or recorded even when the optical recording medium is defective.

On the other hand, to achieve the above object concerning the polarizing optics, the optical element of the present invention comprises:

a first aberration correcting electrode split into a plurality of regions;

a second aberration correcting electrode split into a plurality of regions;

a first counter electrode arranged substantially parallel to the first aberration correcting electrode;

a second counter electrode arranged substantially parallel to the second aberration correcting electrode;

a first phase change layer disposed between the first aberration correcting electrode and the first counter electrode; and a second phase change layer disposed between the second aberration correcting electrode and the second counter electrode, and wherein:

the first phase change layer changes the phase of linearly polarized light polarized in a prescribed direction, and the second phase change layer changes the phase of linearly polarized light polarized at right angles to the linearly polarized light polarized in the prescribed direction. Further, the phase change layer or layers are liquid crystal layers, and the prescribed direction corresponds to the alignment direction of an alignment film.

The above optical element is capable of changing the phase of incident light.

By forming the aberration correcting electrodes with the same split region pattern, wavefront aberrations associated with the tilt angle of the optical recording medium can be corrected using a single optical element even if the polarization direction of incident light is different.

Preferably, in the above optical element, the aberration correcting electrodes and counter electrodes are formed using the same electrically conductive material. This facilitates the fabrication of the optical element.

Further preferably, the electrically conductive material is an Indium Tin Oxide alloy (ITO, Indium Tin Oxide). This serves to reduce light losses at electrode portions.

Preferably, in the above optical element, the refractive index of the liquid crystal changes according to an externally applied control voltage signal. With this provision, the phase of the incident light can be changed by applying an external control voltage signal, to effect aberration correction. Further, since the liquid crystal is used, the magnitude of the external voltage signal can be reduced.

Preferably, the above optical element further includes an antireflective film for preventing reflections of incident light. This serves to prevent light losses due to reflections.

The optical head of the present invention utilizes the above-described optical element of the invention. According, if wavefront aberrations associated with the tilt angle of the optical recording medium are generated, optical aberrations can be corrected accurately when reproducing or recording information on the optical recording medium by means of light.

The above optical head comprises: converging optics for focusing light emitted from the light source onto the optical recording medium, and for converging light reflected from the optical recording medium; a K-quarter wave plate (where K is an odd number) for changing the polarization state of the light emitted from the light source; separating means for passing therethrough light polarized in a particular direction, and for separating light polarized in a direction perpendicular to the particular direction; and a photodetector for outputting a focus error signal and a tracking error signal for the optical recording medium, as well as an information signal, by receiving the light reflected from the optical recording medium and separated by the separating means.

By forming the aberration correcting electrodes with the same split region pattern, if wavefront aberrations associated with the tilt angle of the optical recording medium are generated when the polarization direction of incident light is different, optical aberrations can be corrected accurately when reproducing or recording information on the optical recording medium by means of light.

The optical recording/reproduction apparatus of the present invention uses the above-described optical head of the invention, and reproduces or records information on the optical recording medium. With this apparatus, information can be reliably reproduced or recorded even when the optical recording medium is defective.

BRIEF DESCRIPTION OF THE DRAWINGS

FIG. 9 is a pattern diagram showing another example of the second ITO film in the optical element of the present invention when correcting for both the radial tilt and tangential tilt simultaneously.

DESCRIPTION OF SYMBOLS 1, 201. LIGHT SOURCE
2. DIFFRACTION GRATING
3. COLLIMATOR LENS
4. OPTICAL ELEMENT
5. OBJECTIVE LENS
6. OPTICAL RECORDING MEDIUM
7. FIRST TILT SENSOR
8. SECOND TILT SENSOR
9, 209. OPTICAL ELEMENT DRIVING CIRCUIT
10, 210. FIRST PHOTODETECTOR
11, 211. SECOND PHOTODETECTOR
20, 220. FIRST GLASS
21, 221. FIRST ITO FILM
22, 222. FIRST POLYVINYL ALCOHOL FILM
23, 223. EPOXY RESIN LAYER
24, 224. SECOND POLYVINYL ALCOHOL FILM
25. 225. SECOND ITO FILM

26. TANTALUM OXIDE FILM
27. 227. THIRD ITO FILM
28. SECOND GLASS
29. LIQUID CRYSTAL
202. COLLIMATOR LENS
203. FIRST OPTICAL ELEMENT OF THE INVENTION
204. ANISOTROPIC POLARIZING HOLOGRAM
205. QUARTER WAVE PLATE
206. OBJECTIVE LENS
207. OPTICAL RECORDING MEDIUM
208. TILT SENSOR
226. SECOND GLASS
228. THIRD POLYVINYL ALCOHOL FILM
229. FOURTH POLYVINYL ALCOHOL FILM
230. FOURTH ITO FILM
231. THIRD GLASS
232. FIRST LIQUID CRYSTAL
233. SECOND LIQUID CRYSTAL
270. SECOND ELEMENT OF THE INVENTION
280. FIRST MAGNESIUM FLUORIDE FILM
281. SECOND MAGNESIUM FLUORIDE FILM
282. FIRST ALUMINA FILM
283. SECOND ALUMINA FILM
284. THIRD ALUMINA FILM
285. FOURTH ALUMINA FILM
286. FIFTH ALUMINA FILM
287. SIXTH ALUMINA FILM
288. SEVENTH ALUMINA FILM
289. EIGHTH ALUMINA FILM

PREFERRED EMBODIMENTS OF THE INVENTION

Embodiments of the present invention will be described below with reference to drawings.

Embodiment 1

First, a first embodiment of the present invention will be described with reference to drawings.

Figure 1:
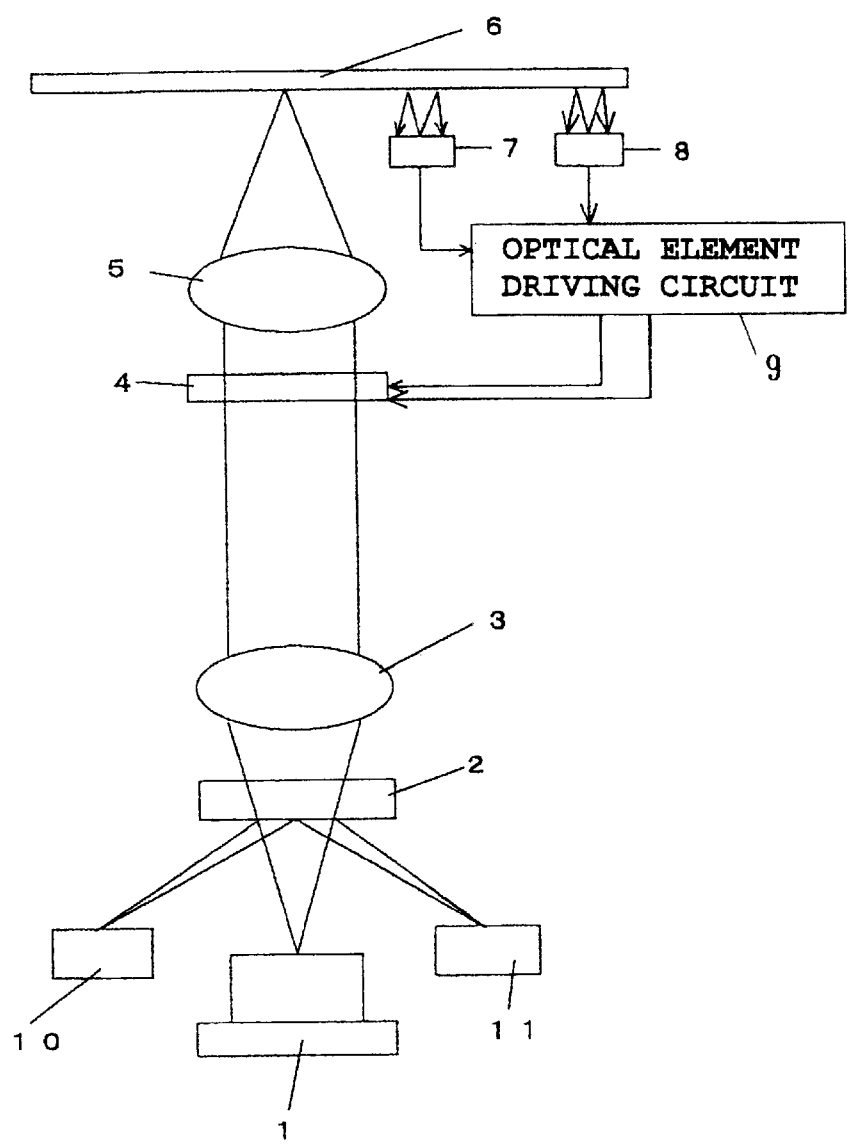
FIG. 1 is a diagram showing the construction of one embodiment of an optical head according to the present invention.

FIG. 1 is a diagram showing the construction of an optical head according to the first embodiment of the present invention. In FIG. 1, reference numeral 1 is a light source, 2 is a diffraction grating, 3 is a collimator lens, 4 is a first optical element (described in detail later) according to the present invention, 5 is an objective lens, 6 is an optical recording medium, 7 is a first tilt sensor, 8 is a second tilt sensor, 9 is an optical element driving circuit, 10 is a first photodetector, and 11 is a second photodetector. Here, converging optics consist of the collimator lens 3 and the objective lens 5, and separating means consists of the diffraction grating 2.

The light source 1 is constructed, for example, from a semiconductor laser device, and outputs recording/playback coherent light directed to a recording layer of the optical recording medium 6. The diffraction grating 2 is constructed by forming a desired pattern on a glass surface using photolithography, and then etching the pattern, and has the characteristics that the zeroth order diffraction efficiency is about 50% and the ± first order diffraction efficiency is about 50%.

The optical element 4 is the optical element of the present invention, and corrects the coma generated when the optical recording medium 6 is tilted in the radial direction and also the coma generated when it is tilted in the tangential direction; the details of this element will be described later.

The objective lens 5 is a lens for focusing light on the recording layer of the optical recording medium 6. The first photodetector 10 is a device which, of the light reflected from the recording layer of the optical recording medium 6, receives the + first order beam diffracted by the diffraction grating 2 and converts it into an electrical signal, and the second photodetector 11 is a device which, of the light reflected from the recording layer of the optical recording medium 6, receives the − first order beam diffracted by the diffraction grating 2 and converts it into an electrical signal.

The first tilt sensor 7 is a sensor that detects the amount of tilt (radial tilt angle) when the optical recording medium 6 is tilted from the normal in the radial direction relative to the optical axis, and that generates a signal proportional to the detected tilt angle; the second tilt sensor 8 is a sensor that detects the amount of tilt (tangential tilt angle) when the optical recording medium 6 is tilted from the normal in the tangential direction relative to the optical axis, and that generates a signal proportional to the detected tilt angle; and the optical element driving circuit 9 is a circuit that applies a signal to the optical element 4 in accordance with the signal generated by the first tilt sensor 7, and also applies a signal to the optical element 4 in accordance with the signal generated by the second tilt sensor 8.

The operation of the thus constructed optical head will be described with reference to FIG. 1. A portion of the linearly polarized light emitted from the light source 1 passes through the diffraction grating 2 and enters the collimator lens 3, from which the light emerges as a parallel beam of light and enters the optical element 4. If the optical recording medium 6 is tilted from the normal in the radial direction relative to the optical axis, the first tilt sensor 7 outputs a signal corresponding to the radial tilt angle, and if it is tilted from the normal in the tangential direction relative to the optical axis, the second tilt sensor 8 outputs a signal corresponding to the tangential tilt angle; each of these signals is input to the optical element driving circuit 9 which then outputs the necessary signal to generate such a wavefront aberration that compensates for the wavefront aberration caused when the optical recording medium 6 is tilted, and this signal is input to the optical element 4.

Thus, the light entering the optical element 4, as it passes through the optical element 4, is given the wavefront aberration that compensates for the wavefront aberration caused when the optical recording medium 6 is tilted. The light passed through the optical element 4 is focused onto the optical recording medium 6 by means of the objective lens 5. Here, since the light having the wavefront aberration that compensates for the wavefront aberration caused when the optical recording medium 6 is tilted is focused through the objective lens 5, a light spot free from aberrations and thus focused to the diffraction limit is formed on the optical recording medium 6.

Next, the light reflected from the optical recording medium 6 emerges with a wavefront aberration proportional to the tilt of the optical recording medium 6, but this wavefront aberration is corrected for by the optical element 4. The light passed through the optical element 4 passes through the collimator lens 3 and is diffracted by the diffraction grating 2, which directs the + first order beam of the diffraction to the photodetector 10 and the − first order beam of the diffraction to the photodetector 11.

The photodetector 10 outputs a focus error signal indicating the focusing condition of the light on the optical recording medium 6, and also outputs a tracking error signal indicating the position of the light shone thereon. One of these signals is supplied to focus control means not shown and, based on the focus error signal, the focus control means controls the position of the objective lens 5 along its optical axis so that the light is always kept in focus on the optical recording medium 6.

On the other hand, tracking control means not shown controls the position of the objective lens 5 based on the tracking error signal so that the light is kept focused on the desired track on the optical recording medium 6. The information recorded on the optical recording medium 6 is obtained from the second photodetector 11.

Figure 2:
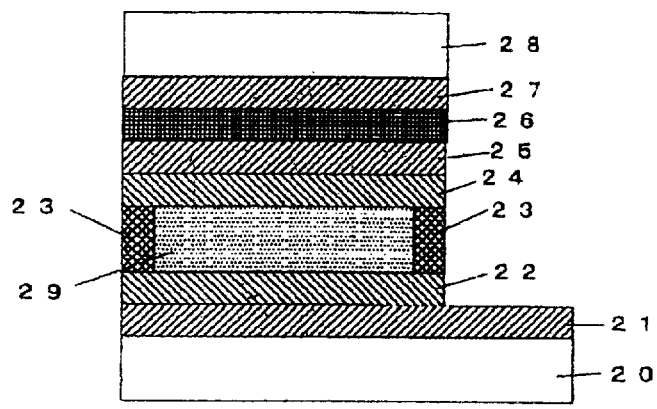
FIG. 2 is a cross sectional view showing one embodiment of an optical element according to the present invention.

Next, the first optical element 4 of the present invention will be described in detail. FIG. 2 is a cross sectional view of the optical element according to the first embodiment of the present invention. In FIG. 2, reference numeral 20 is first glass, 21 is a first ITO film (Indium Tin Oxide alloy), 22 is a first polyvinyl alcohol film, 23 is an epoxy resin layer, 24 is a second polyvinyl alcohol film, 25 is a second ITO film, 26 is a tantalum oxide film, 27 is a third ITO film, 28 is second glass, and 29 is a liquid crystal.

Here, the first, second, and third ITO films 21, 25, and 27 are deposited on the inside surfaces of the glass, and function as transparent electrodes via which external signals are applied to the liquid crystal 29 and through which light is transmitted; the first and second polyvinyl alcohol films 22 and 24 are deposited on the first and second ITO films 21 and 25, respectively, and are rubbed with a nylon or other polymer cloth so they function as alignment films for controlling the alignment of the liquid crystal 29; the epoxy resin layer 23 is a sealing layer for preventing the liquid crystal 29 from leaking outside; and the tantalum oxide film 26 is an insulating layer for electrically insulating the second and third ITO films 25 and 27 from each other.

The first ITO film 21 is uniformly deposited over the first glass 22, while the second ITO film 25 is formed with the pattern shown in FIG. 6 and the third ITO film 27 with the pattern shown in FIG. 4 (these patterns will be described later).

The optical element of the present embodiment functions as an aberration correcting element: the first ITO film 21 corresponds to the counter electrode of the invention, the second ITO film 25 corresponds to the first aberration correcting electrode of the invention, the third ITO film 27 corresponds to the second aberration correcting electrode of the invention, the tantalum oxide film 26 corresponds to the insulating film of the invention, and the liquid crystal 29 corresponds to the phase change layer of the invention.

Next, a description will be given of the basic principle of the method for correcting tilt-induced coma.

Figure 3:
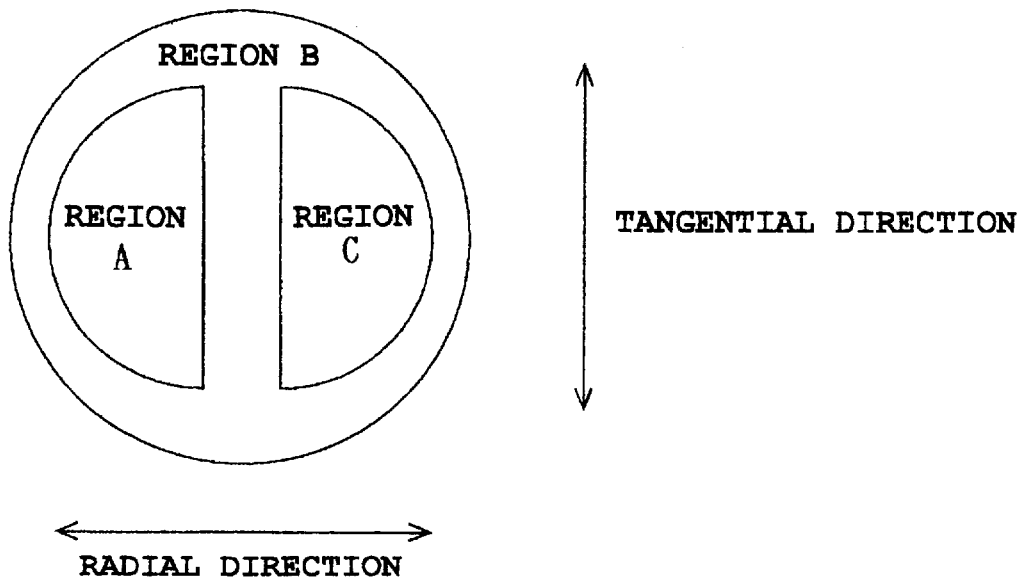
FIG. 3 is a pattern diagram of a radial tilt correcting second ITO film in the optical element of the present invention.
Figure 4:
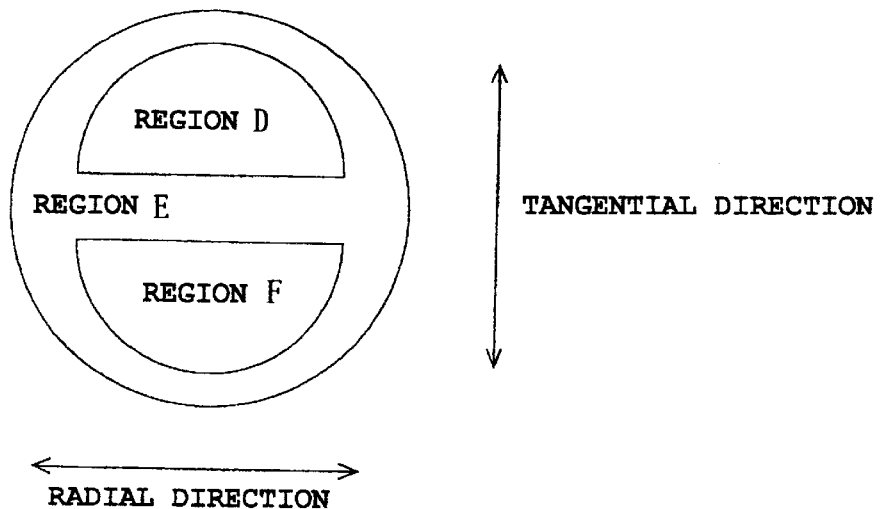
FIG. 4 is a pattern diagram of a tangential tilt correcting third ITO film in the optical element of the present invention.
Figure 23:
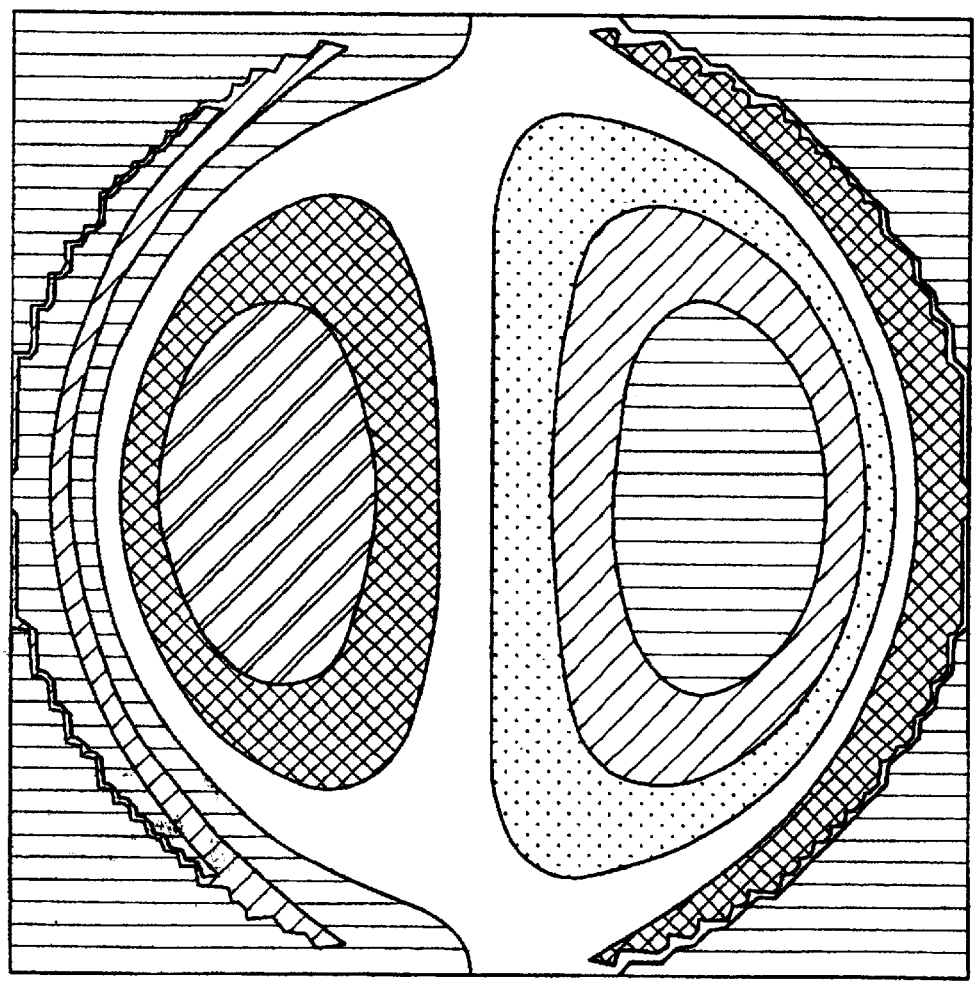
FIG. 23 is a graph showing one example of a wavefront aberration in the presence of a radial tilt angle of 1 degree.

In the presence of tilt of 1 degree, the phase pattern at the best focal plane is as shown in FIG. 23; for patterns used to correct tilt-induced coma, therefore, the pattern shown in FIG. 3 should be used when correcting the coma caused by the radial tilt alone, and the pattern shown in FIG. 4 should be used when correcting the coma caused by the tangential tilt alone.

For example, consider the case where the optical recording medium 6 is tilted only in the radial direction. In this case, the pattern shown in FIG. 3 is used for the second ITO film, and external voltages are applied to the first and second ITO films 21 and 25, applying different electric fields across the liquid crystal in desired positions (regions A, B, and C in FIG. 3) and thus changing the phases of the desired positions to correct for the coma caused by the radial tilt.

The method of voltage application will be described below. Generally, the liquid crystal is driven by an AC voltage and, as shown in FIG. 5, the relationship between the rms value of the applied AC voltage and the refractive index of the liquid crystal is such that the refractive index is substantially constant until the applied voltage reaches a certain value and, at voltages larger than that value, the refractive index decreases linearly until reaching a point beyond which the refractive index does not decrease further and remains nearly unchanged.

Figure 5:
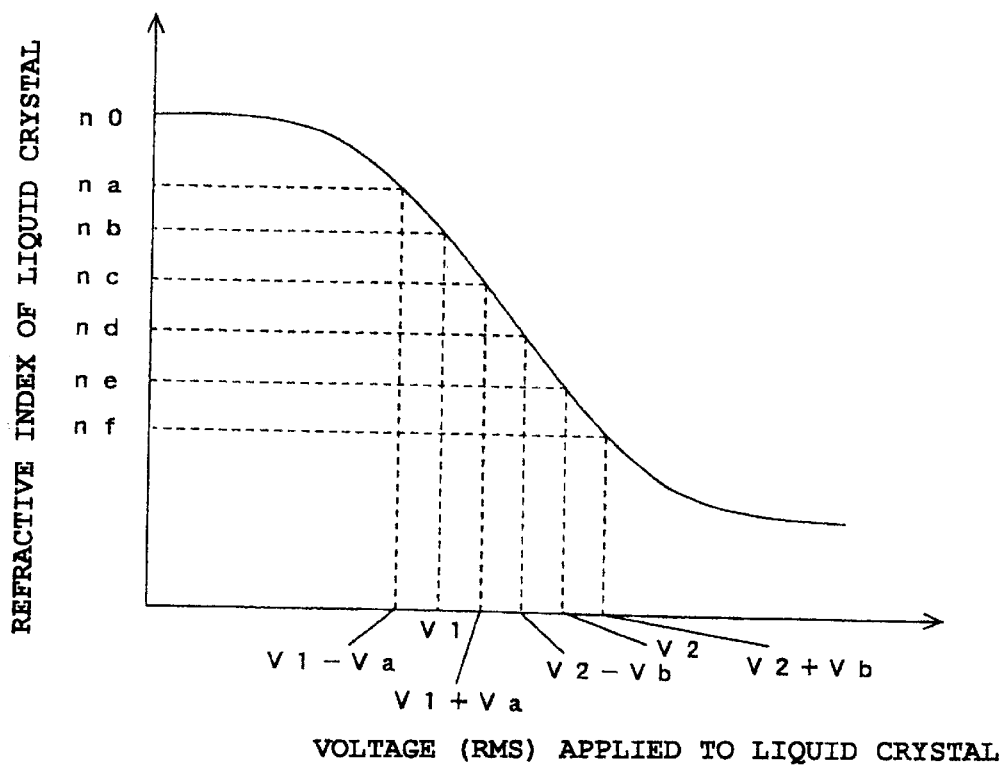
FIG. 5 is a graph showing the relationship between the refractive index of liquid crystal and the applied voltage in the optical element of the present invention.

As can be seen from FIG. 5, for example, the third ITO film 27 is grounded or set free, the first ITO film 21 is grounded (supplied with 0 V), and V1−Va is applied to the region A of the second ITO film 25, and V1 is applied to the region B of the second ITO film 25, and V1+Va is applied to the region C of the second ITO film 25, thus setting the refractive indices of the liquid crystal in the respective regions to na, nb, and nc so that the regions A and C provide positive and negative phases relative to the region B; in this way, a phase distribution compensating for the phase distribution shown in FIG. 23 can be provided.

Next, consider the case where the optical recording medium 6 is tilted only in the tangential direction. In this case, the second ITO film 25 is set free, the pattern shown in FIG. 4 is used for the third ITO film 27, 0 V is applied externally to the first ITO film, and V2−Vb is applied externally to the region D of the third ITO film 27, and V2 is applied externally to the region E of the third ITO film 27, V2+Vb is applied externally to the F of the third ITO film 27, thus setting the refractive indices of the liquid crystal in the respective regions to nd, ne, and nf so that the regions D and F provide positive and negative phases relative to the region E; by so doing, the coma caused by the tangential tilt can be corrected.

However, the situation is different if the optical recording medium 6 is tilted in both the radial and tangential directions, and if the coma caused by the radial tilt and the coma caused by the tangential tilt are to be corrected simultaneously.

In this case, external voltages are applied to all of the first, second, and third ITO films 21, 25, and 27 (0 V is applied to the first ITO film 21), but the electric fields supposed to be formed between the third ITO film 27 and the first ITO film 21 are not formed because of the interference from the voltages being applied to the second ITO film 25, and instead, electric fields are formed between the second and third ITO films 25 and 27.

Figure 6:
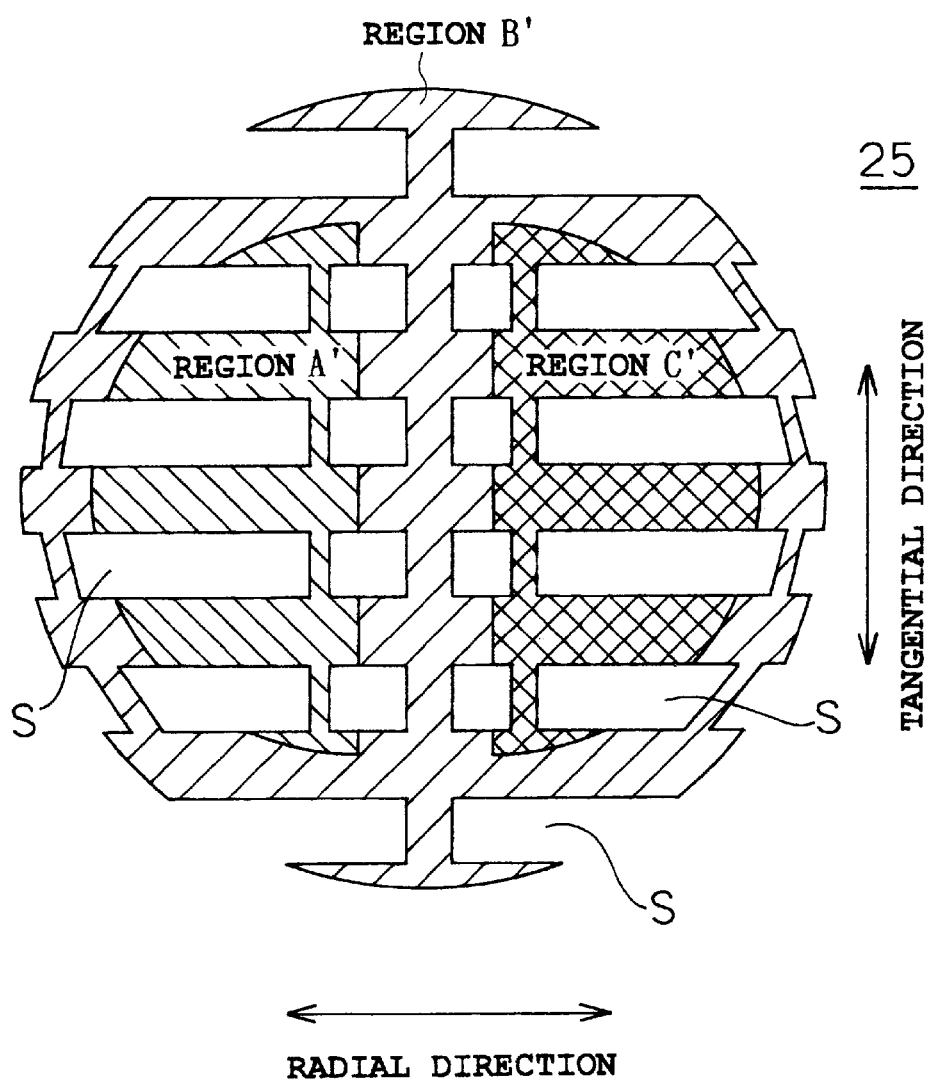
FIG. 6 is a pattern diagram showing one example of the second ITO film in the optical element of the present invention when correcting for both the radial tilt and tangential tilt simultaneously.

Considering this, the pattern of the second ITO film 25, on the basis of FIG. 3, is modified as shown in FIG. 6. Here, reference character S indicates an opening.

As shown, the second ITO film 25 has numerous openings S (the pattern of FIG. 3 is interwoven with void portions, that is, a plurality of openings S are formed in the pattern), providing electrically open positions and thus permitting electric fields to be formed between the third ITO film 27 and the first ITO film 21; as a result, necessary electric fields can be applied to the liquid crystal 29.

With this pattern, therefore, the radial tilt can be corrected using the second ITO film 25, and at the same time, the tangential tilt can be corrected using the third ITO film 27. In FIG. 6, the phase is changed in three regions A', B', and C' which correspond to the regions A, B, and C in FIG. 3, and the number of externally applied signals is the same as the number of signals applied when performing correction using the pattern of FIG. 3.

A pattern for correcting aberrations by splitting the pattern into many regions in a lattice form is described in Japanese Laid-open No. 9-128785. With this pattern, if many kinds of aberrations exist in a mixed manner, the aberrations can be corrected perfectly by applying optimum voltages to respective lattice regions, but this requires a very large number of external signals, increasing flexible flat cable and increasing the size of the optical element itself; if this optical element is used in the optical head, compact construction becomes difficult to achieve for the optical head.

By comparison, according to the optical element of the present invention, though the correction effect somewhat degrades because the pattern includes void portions, the number of externally applied voltages can be reduced considerably, making it easier to make the optical element, and hence, the optical head, compact in construction.

In this case, since the pattern shown in FIG. 6 is used as the pattern for correcting the coma caused by the radial tilt, the method of coma correction somewhat differs when only the radial tilt exists. This will be explained below.

The pattern shown in FIG. 6 includes portions where no voltage is applied; therefore, if Va is applied to the region A', and Vb is applied to the region B', and Vc is applied to the region C', to set the refractive indices of the liquid crystal in the respective regions to na, nb, and nc, respectively, the refractive index of the liquid crystal in the void regions is unchanged at n0. If this happens, though the regions A' and C' provide positive and negative phases relative to the region B' as earlier described, a large positive phase is given to the void regions.

This would cause large high order aberrations, degrading the correction effect. To address this problem, voltage Vb is applied uniformly to the third ITO film 27 to set the refractive index of the liquid crystal in the void regions to nb, reducing the high order aberrations and thus enhancing the correction effect.

Next, the tantalum oxide film 26 will be described. The tantalum oxide film 26 is provided to electrically insulate the second and third ITO films 25 and 27 from each other.

The reason why tantalum oxide is used as the material for the insulating film will be described. Since the insulating film is interposed between the second and third ITO films 25 and 27, reflections occur at the interface between the insulating film and each ITO film, causing losses in the amount of transmitted light. In view of this, if the insulating film is formed from a material having the same refractive index as the ITO film, reflections occurring at the interface between the ITO film and the insulating film can be reduced. The refractive index of the ITO film is about 2; therefore, if the tantalum oxide having the refractive index of 2 is used as the material for the insulting film, reflections and, hence, light losses, can be reduced.

The pattern of the second ITO film 25 will be described in further detail below. Since the electrode pattern necessary for aberration correction has void portions, the aberration correction effect will degrade. To compensate for this, if the electrode portions were supplied with voltages larger than the voltages that would be applied when the pattern was in a complete form, it would be possible to perfectly correct the third order coma that occurs when the optical recording medium is tilted.

However, since the pattern has void portions, other aberrations than the third order coma would be generated. In view of this, if a radial tilt correcting pattern with void portions arranged at equally spaced intervals in the radial direction, such as the one shown in FIG. 7, is used for the second ITO film, the amount of aberration increase associated with the void portions, after the aberration correction, will be mostly due to high order aberrations, because the void portions are equally spaced apart; as a result, playback jitter after the correction when the optical recording medium is tilted becomes small compared with the jitter at the time of complete correction.

Further, it is desirable that regions where the same voltage is applied be connected together. This will serve to reduce the number of lines necessary to apply external voltages. Furthermore, if the pitch between void portions is reduced, the pattern becomes almost uniform and the jitter characteristic after the aberration correction further improves. Especially, if the pitch is made smaller than one-tenth of the effective diameter, a correction effect with an acceptable amount of jitter can be obtained.

As for the pattern of the third ITO film 27 shown in FIG. 4, not all the portions shown are necessary; in fact, since the portions facing the portions of the second ITO film 25 are portions that cannot face the liquid crystal layer, electrodes need not be formed in such portions, but if electrodes are formed only in the necessary portions, the electrodes will be split into small separate regions; since it is desirable that the regions where the same voltage is applied be connected together, as noted above, it is desirable that the electrodes be formed in the unnecessary portions as well, as shown in FIG. 4.

Figure 7:
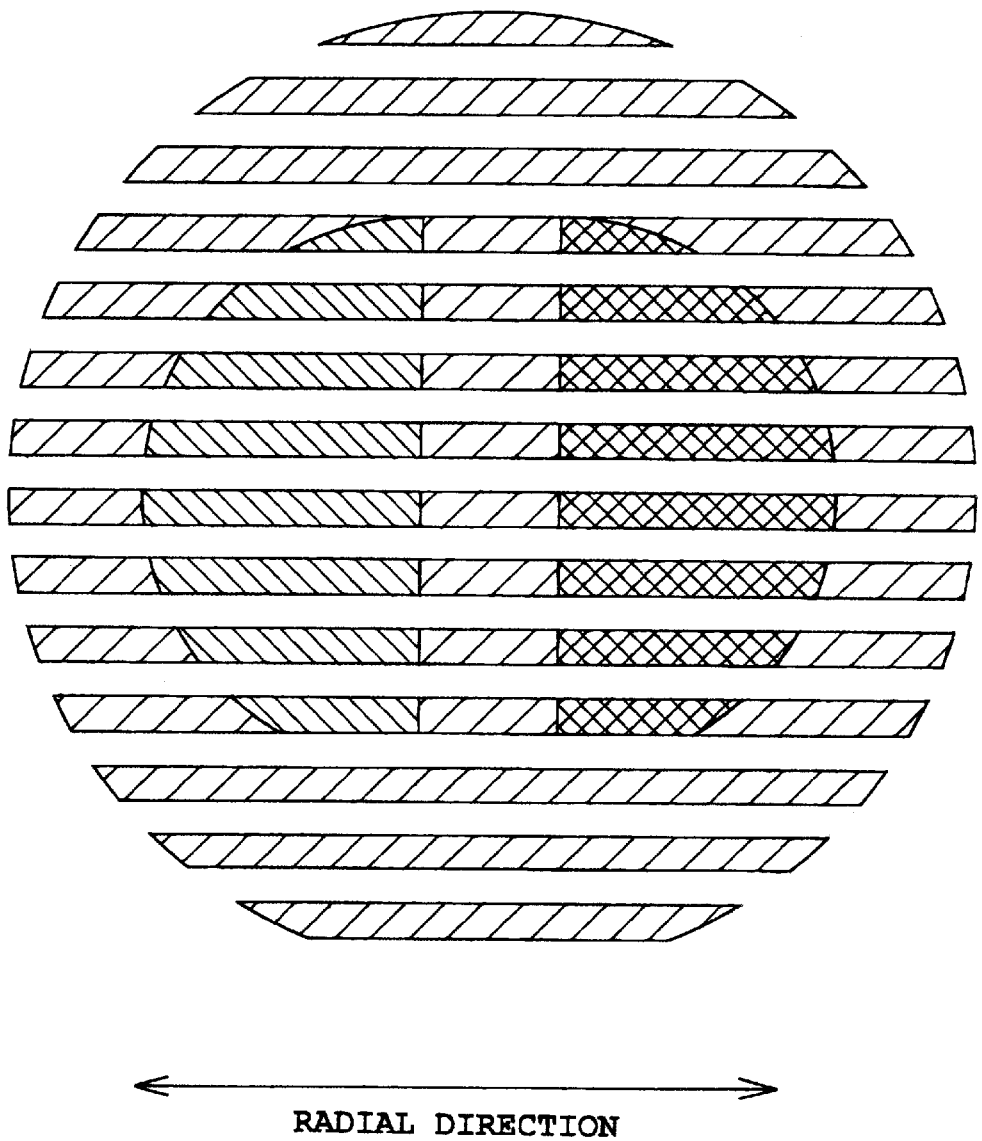
FIG. 7 is a pattern diagram showing another example of the second ITO film in the optical element of the present invention when correcting for both the radial tilt and tangential tilt simultaneously.
Figure 8:
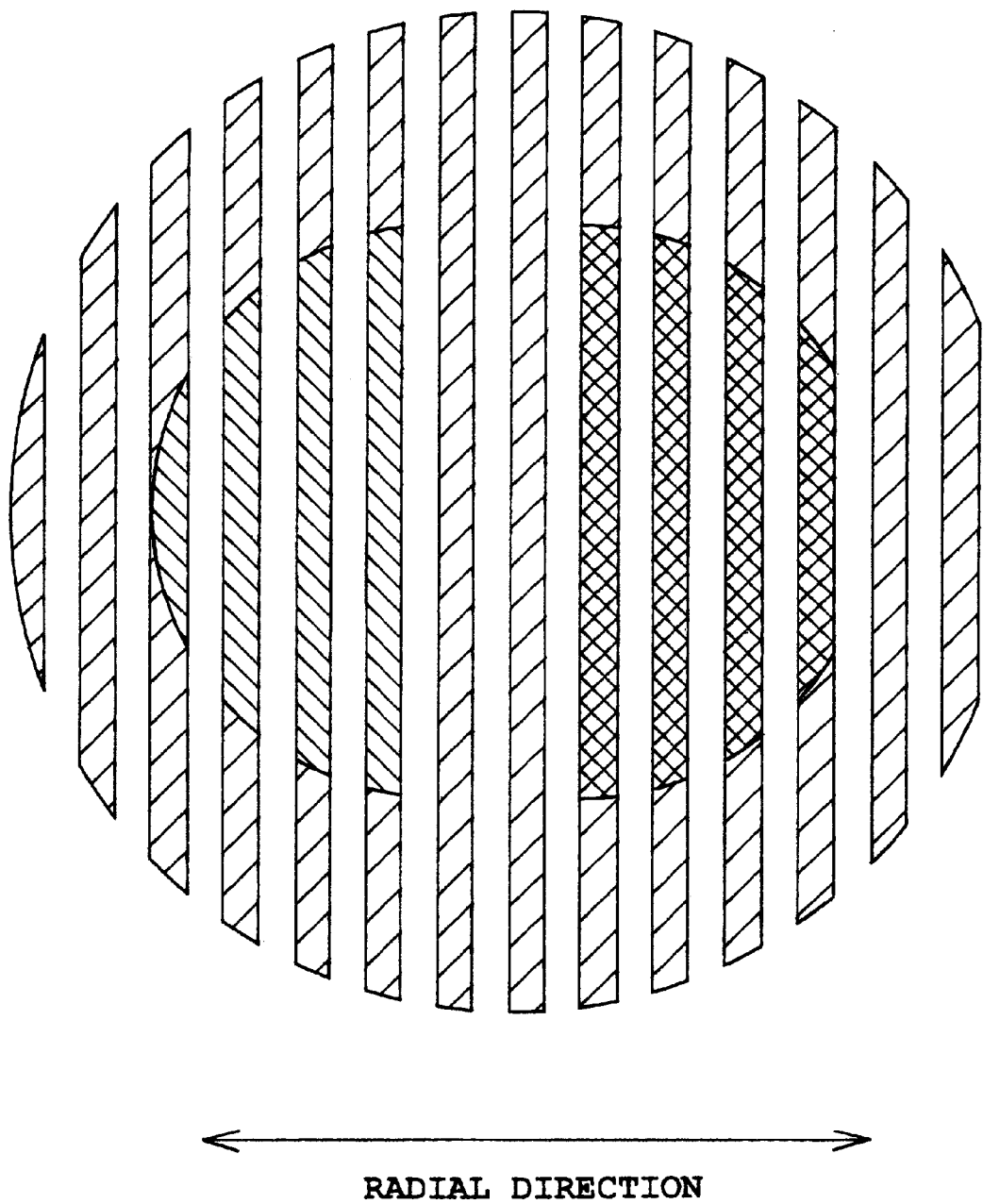
FIG. 8 is a pattern diagram showing another example of the second ITO film in the optical element of the present invention when correcting for both the radial tilt and tangential tilt simultaneously.

In the electrode pattern shown in FIG. 7, the void portions are formed parallel to the radial direction, but there will be no problem if the void portions are formed in any direction (FIG. 8 shows an example in which the void portions are formed parallel to the tangential direction).

If the void portions are formed in a mesh-like form (FIG. 9), non-correcting portions are further equalized, further reducing the amount of degradation of aberration correction.

Next, referring to FIG. 2, an example of a fabrication method for the optical element 4 will be described. In the fabrication of the optical element 4, first the third ITO film 27 is formed on top of the second glass 28. The third ITO film 27 can be formed by first forming an ITO film uniformly, for example, by sputtering, and then patterning the ITO film by photolithography and etching.

After that, the tantalum oxide film is formed in such a manner as to cover the third ITO film 27. The tantalum oxide film is formed by evaporation and then planarized by polishing.

After that, an ITO film is formed uniformly over the planarized tantalum oxide film 26, for example, by sputtering, and then the ITO film is patterned by photolithography and etching to form the second ITO film 25. In this case, the pattern of the second ITO film 25 must be formed with its center aligned with the center of the pattern of the third ITO film 27; this must be done in the photolithography step.

After that, the second polyvinyl alcohol film 24 is formed, for example, by spin coating. While the above process is being performed, the first ITO film 21 and the first polyvinyl alcohol film 22 are formed on top of the opposing first glass 20. Here, the first ITO film 21 and the first polyvinyl alcohol film 22 can be formed using the same process as described above.

The first and second glass sheets 20 and 28 thus fabricated are then held opposite each other with the epoxy resin layer 23 sandwiched therebetween, and in this condition, the liquid crystal 29 is filled into the space between the first and second polyvinyl alcohol films 22 and 24. This completes the fabrication of the optical element 4.

The above fabrication process allows the use of a large glass substrate, and is therefore suitable for mass production. The pattern alignment between the second and third ITO films 25 and 27, which was briefly touched on earlier, will be described below.

If the center of the pattern of the second ITO film 25 were displaced from the center of the pattern of the third ITO film 27, the phase distribution associated with the tilt of the optical recording medium 26 and the pattern for correcting it would also be displaced, degrading the correction effect. Accordingly, the patterns of the second and third ITO films 25 and 27 must be centered precisely.

Figure 21:
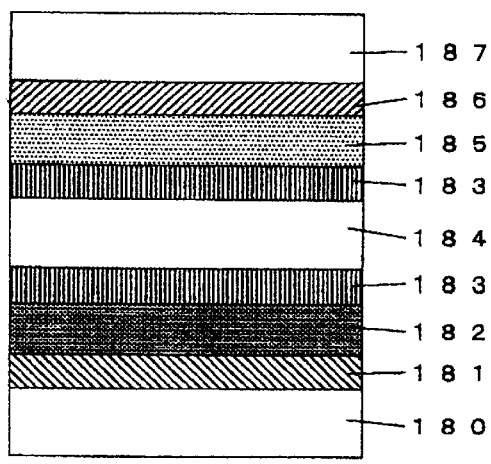
FIG. 21 is a cross sectional view showing one example of a prior art optical element.
Figure 22:
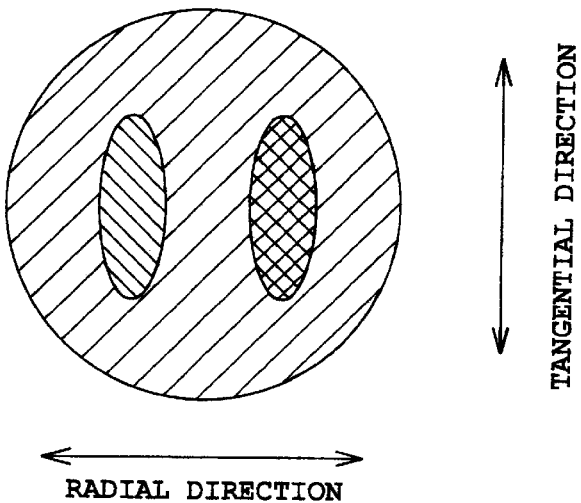
FIGS. 22(A) and 22(B) are diagrams showing radial tilt and tangential tilt correcting patterns in the prior art optical element.
Figure 22:
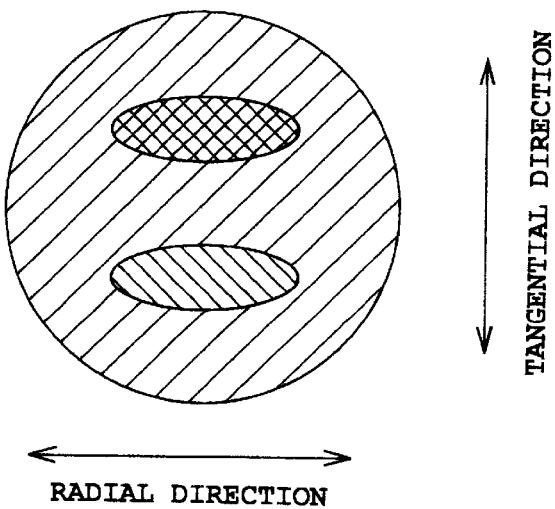

In the optical element (FIG. 21) described in the prior art, the two patterns are separated by a distance equal to the thickness of one glass sheet (about 500 μm). It is therefore difficult to align the patterns precisely. By contrast, in the optical element 4 of the present embodiment, since the two patterns are separated by only a small distance equal to the thickness of the tantalum oxide film 26 (a few micrometers), it is easy to align the patterns precisely. The optical element of the present embodiment is therefore easy to fabricate, and the cost can be reduced correspondingly.

Next, consider the case where the tantalum oxide film is formed using a solgel method. The solgel method forms a metal oxide by applying a liquid organic metal over the entire surface of a substrate by spin coating and then evaporating the organic substance by heating; therefore, this method is effective when covering the stepped surface and planarizing it and, when this method is used, the cost can be further reduced since the polishing step is not needed.

As described above, by providing a plurality of aberration correcting electrodes on the same side of the substrate, an optical element thin in construction and capable of correcting a plurality of aberrations simultaneously can be implemented at low cost. Further, by forming the insulating film from a material having the same refractive index as the ITO film, light losses can be reduced, increasing the efficiency of utilization of light.

Furthermore, by using the solgel method for the formation of the insulating film, a low cost fabrication method can be achieved. Further, when the above optical element is used in the optical head, since the margin for tilt increases, it becomes easier to adjust the component parts of the optical head, facilitating the fabrication of the optical head.

Accordingly, an optical head having a large tilt margin can be implemented at low cost. Further, the optical head capable of correcting a plurality of aberrations can be made thin and compact in construction. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial and tan gential directions). Moreover, since the optical head itself is low cost and suitable for thin construction, the optical recording/reproduction apparatus can also be made low cost and thin in construction.

Embodiment 2

A second embodiment of the present invention will be described below with reference to drawings. This embodiment differs from the foregoing first embodiment only in the pattern used in the optical element 4 for aberration correction; otherwise, the present embodiment is the same as the first embodiment. In the present embodiment, therefore, the construction is the same as that of the first embodiment unless specifically indicated otherwise, and component members designated by the same reference numerals as those in the first embodiment are the same in function as the corresponding members in the first embodiment, unless specifically noted otherwise.

Figure 10:
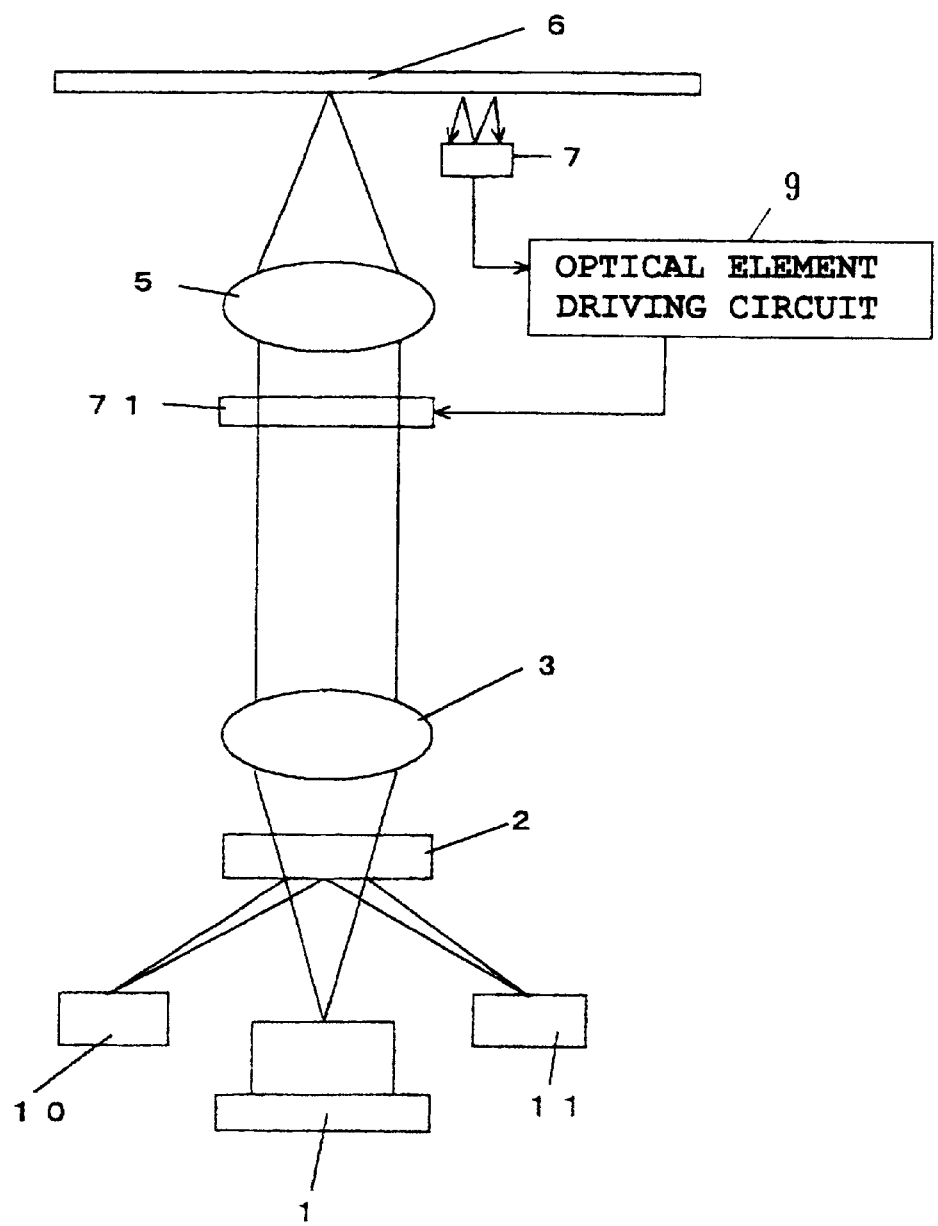
FIG. 10 is a diagram showing the construction of another embodiment of an optical head according to the present invention.

FIG. 10 is a diagram showing the construction of an optical head according to the second embodiment of the present invention. Reference numeral 71 indicates a second optical element according to the present invention.

The optical element 71, designated as the second optical element of the invention, is a device that corrects the coma caused when the optical recording medium 6 is tilted in the radial direction and also the spherical aberration caused when the thickness of the optical recording medium 6 changes; the details of this device will be described later.

The operation of the thus constructed optical head will be described with reference to FIG. 10. A portion of the linearly polarized light emitted from the light source 1 passes through the diffraction grating 2 and enters the collimator lens 3, from which the light emerges as a parallel beam of light and enters the optical element 71.

If the optical recording medium 6 is tilted from the normal in the radial direction relative to the optical axis, the tilt sensor 7 outputs a signal corresponding to the radial tilt angle, and the signal is input to the optical element driving circuit 9 which then outputs the necessary signal to generate such a wavefront aberration that compensates for the wavefront aberration caused when the optical recording medium 6 is tilted; this signal is input to the optical element 71.

Further, the optical element driving circuit 9 outputs the necessary signal to generate such a wavefront aberration that compensates for the spherical aberration associated with the substrate thickness of the optical recording medium 6, and this signal is input to the optical element 71. Here, the substrate thickness of the optical recording medium 6 is learned in advance. That is, each time the optical recording medium 6 is mounted on the recording/reproduction apparatus, its substrate thickness is detected. Alternatively, the substrate thickness may be detected using a sensor while the optical recording medium 6 is rotating.

Then, the light entering the optical element 71, as it passes through the optical element 71, is given such wavefront aberrations that compensate for the coma caused when the optical recording medium 6 is tilted and the spherical aberration caused when the substrate thickness changes. The light passed through the optical element 71 is focused onto the optical recording medium 6 by means of the objective lens 5.

Here, since the light having the wavefront aberration that compensates for the wavefront aberration caused when the optical recording medium 6 is tilted, and also having the wavefront aberration that compensates for the wavefront aberration caused when the substrate thickness of the optical recording medium 6 changes, is focused through the objective lens 5, a light spot free from aberrations and thus focused to the diffraction limit is formed on the optical recording medium 6.

Next, the light reflected from the optical recording medium 6 emerges with wavefront aberrations proportional to the tilt and the substrate thickness of the optical recording medium 6, but these wavefront aberrations are corrected for by the optical element 71. The light passed through the optical element 71 passes through the collimator lens 3 and is diffracted by the diffraction grating 2, which directs the + first order beam of the diffraction to the photodetector 10 and the − first order beam of the diffraction to the photodetector 11.

The photodetector 10 outputs a focus error signal indicating the focusing condition of the light on the optical recording medium 6, and also outputs a tracking error signal indicating the position of the light shone thereon. One of these signals is supplied to focus control means not shown and, based on the focus error signal, the focus control means controls the position of the objective lens 5 along its optical axis so that the light is always kept in focus on the optical recording medium 6.

On the other hand, tracking control means not shown controls the position of the objective lens 5 based on the tracking error signal so that the light is kept focused on the desired track on the optical recording medium 6. The information recorded on the optical recording medium 6 is obtained from the second photodetector 11.

Next, the second optical element 71 of the present invention will be described in detail. The present embodiment differs from the first optical element described in the foregoing first embodiment only in that the third aberration correcting electrode is provided to correct the spherical aberration; otherwise, the present embodiment is the same as the first embodiment. In the present embodiment, therefore, the construction is the same as that of the first embodiment unless specifically indicated otherwise, and component members designated by the same reference numerals as those in the first embodiment are the same in function as the corresponding members in the first embodiment, unless specifically noted otherwise.

Figure 11:
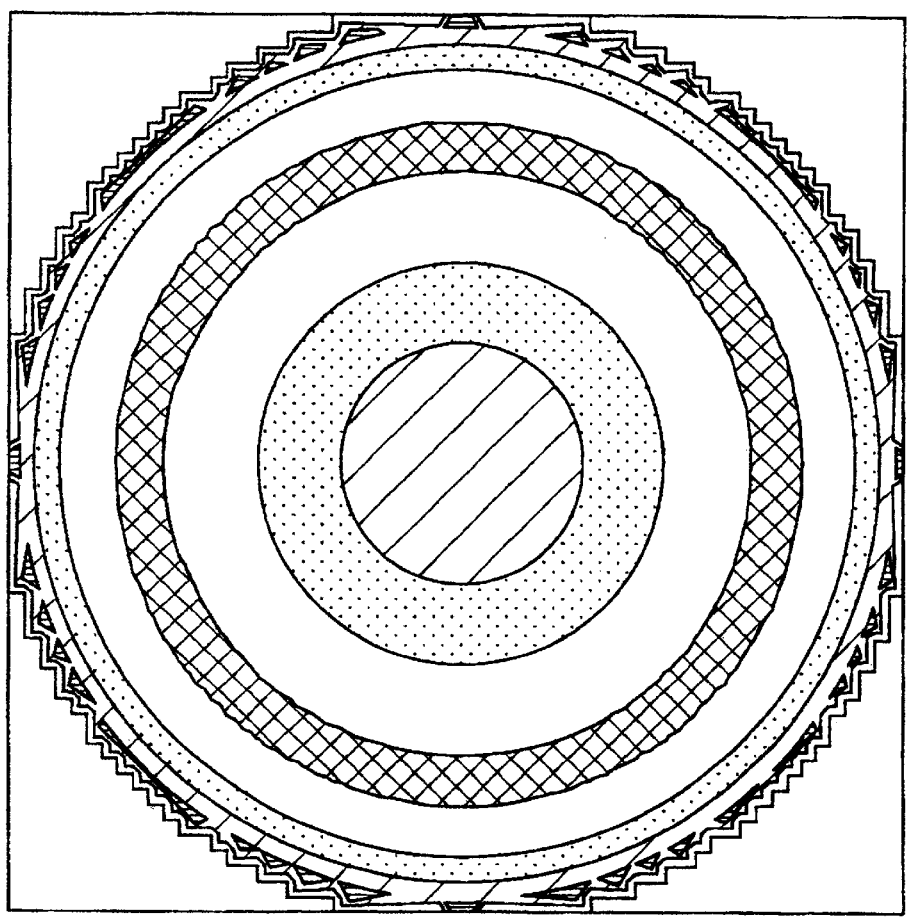
FIG. 11 is a graph showing one example of a wavefront aberration which is generated when the thickness of an optical recording medium is 0.64 mm.
Figure 12:
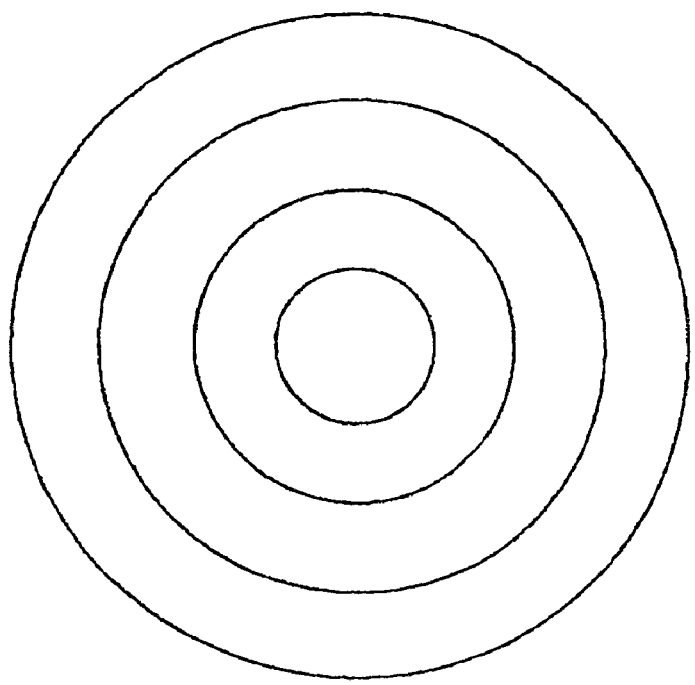
FIG. 12 is a pattern diagram of a spherical aberration correcting third ITO film in the optical element of the present invention.

First, the correction for spherical aberration will be described. When the objective lens is designed such that the spherical aberration is zero when the substrate thickness is 0.6 mm, a spherical aberration will develop if the substrate thickness of the optical recording medium 6 deviates from 0.6 mm. FIG. 11 shows the phase pattern at the best focal plane when the substrate thickness is 0.64 mm. From the figure, it will be easily understood that the second aberration correcting electrode should be patterned as shown in FIG. 12. As described in the first embodiment, when correcting only for the radial tilt, voltages should be applied only to the first and second ITO films 21 and 25, and when correcting only for the spherical aberration caused by variations in the substrate thickness, voltages should be applied only to the first and third ITO films 21 and 27. Further, when correcting for the two kinds of aberrations simultaneously, since the second ITO film 25 has a pattern in which the ITO film is partially removed as shown in FIG. 6, the two kinds of aberrations can be corrected simultaneously by applying external voltages to the first, second, and third ITO films 21, 25, and 27.

Next, a description will be given of how the amount of spherical aberration is learned in advance. First, a portion at a certain radius (for example, inner radius) of the optical recording medium 6 is played back without correcting the spherical aberration, but correcting other aberrations; then, jitter of the playback signal is detected, and its value is stored in a storage means such as a memory. Next, a voltage for correcting the spherical aberration caused when the substrate is thinner than 0.6 mm is applied to the optical element, and jitter of the playback signal is detected and compared with the previously stored jitter. If the jitter when this voltage is applied is smaller, then it follows that the substrate is thinner than 0.6 mm.

Conversely, if the jitter when this voltage is applied is larger, then a voltage for correcting the spherical aberration caused when the substrate is thicker than 0.6 mm is applied to the optical element, and jitter of the playback signal is detected. If this jitter is larger than the jitter occurring when the voltage is not applied, the substrate thickness is 0.6 mm, and the correction for spherical aberration is not needed, but if the jitter is smaller, it means that the substrate is thicker than 0.6 mm.

By applying a voltage and then comparing the jitter as described above, and by repeating this step, an optimum value can be obtained for the voltage to be applied, and by repeating the process starting from the inner radius and working toward the outer radius, the optimum value of the spherical aberration correcting voltage at each radial position is stored in the storage means such as a memory; during actual playback, the voltage to be applied is read from the storage means such as a memory, according to the radial position to be played back, and the optical element driving circuit 9 applies the voltage to the optical element 71.

As described above, by providing a plurality of aberration correcting electrodes on the same side of the substrate, an optical element thin in construction and capable of correcting a plurality of aberrations simultaneously can be implemented at low cost. Further, by forming the insulating film from a material having the same refractive index as the ITO film, light losses can be reduced, increasing the efficiency of utilization of light.

Furthermore, by using the solgel method for the formation of the insulating film, a low cost fabrication method can be achieved. Further, when the above optical element is used in the optical head, since the margin for tilt increases, it becomes easier to adjust the component parts of the optical head, facilitating the fabrication of the optical head.

Accordingly, an optical head having a large tilt margin can be implemented at low cost. Further, the optical head capable of correcting for a plurality of aberrations can be made thin and compact in construction. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial direction and having a substrate thickness deviating from the specified thickness). Moreover, since the optical head itself is low cost and suitable for thin construction, the optical recording/reproduction apparatus can also be made low cost and thin in construction.

Embodiment 3

A third embodiment of the present invention will be described below with reference to drawings. This embodiment differs from the previously described first embodiment only in that the optical element 4 is provided with antireflective films; otherwise, the present embodiment is the same as the first embodiment. In the present embodiment, therefore, the construction is the same as that of the first embodiment unless specifically indicated otherwise, and component members designated by the same reference numerals as those in the first embodiment are the same in function as the corresponding members in the first embodiment, unless specifically noted otherwise.

Figure 13:
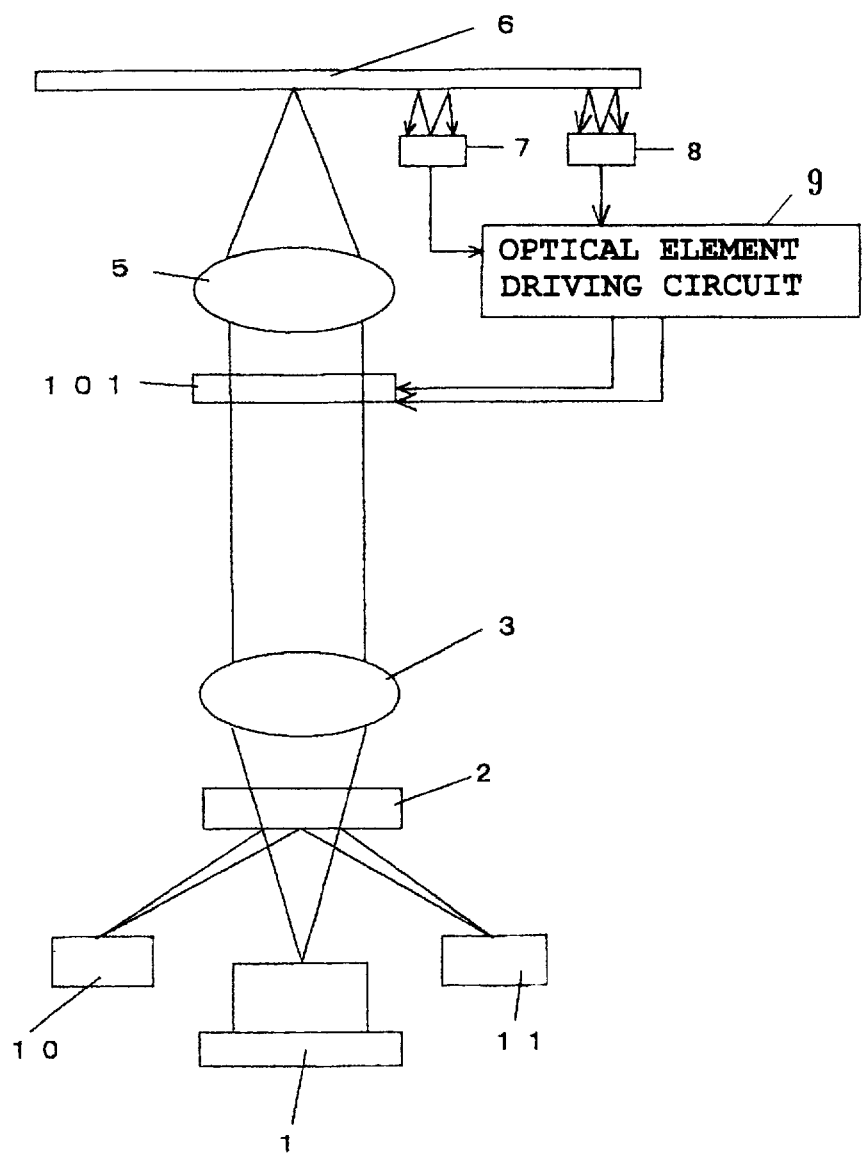
FIG. 13 is a diagram showing the construction of another embodiment of an optical head according to the present invention.

FIG. 13 is a diagram showing the construction of an optical head according to the third embodiment of the present invention. Reference numeral 101 indicates a third optical element according to the present invention. The optical element 101 here is the same as the first optical element 4 of the present invention, the only difference being the inclusion of antireflective films.

The operation of the thus constructed optical head is exactly the same as that described in the first embodiment, and will not be described here in detail.

Figure 14:
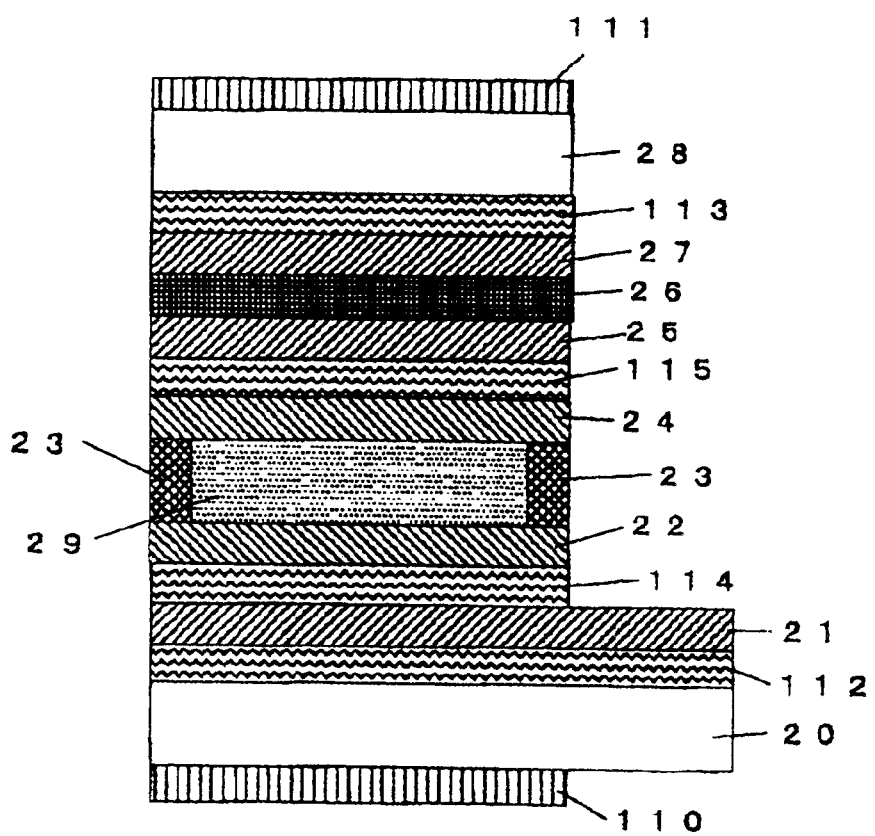
FIG. 14 is a cross sectional view showing another embodiment of an optical element according to the present invention.

The third optical element 101 of the present invention will be described below. FIG. 14 is a cross sectional view of the optical element 101 according to the third embodiment of the present invention. The optical element of this embodiment functions as an aberration correcting element, and is fabricated, as shown in FIG. 14, by forming first and second magnesium fluoride films 110 and 111 (each corresponding to the antireflective film of the present invention) on the first glass 20 and the second glass 28, respectively, of the optical element of the first embodiment, and also forming first, second, third, and fourth alumina films 112, 113, 114, and 115 (each corresponding to the antireflective film of the present invention) between the first glass 20 and the first ITO film 21, between the second glass 28 and the third ITO film 27, between the first ITO film 21 and the first polyvinyl alcohol film 22, and between the second ITO film 25 and the second polyvinyl alcohol film 24, respectively.

First, the first and second magnesium fluoride films 111 and 112 will be described. The first and second magnesium fluoride films 111 and 112 are provided to prevent reflections of the incident beam at the surfaces of the first glass 20 and the second glass 28, respectively. Denoting the refractive index of glass by n(glass) and the refractive index of air by n(air) the refractive index n1 of the antireflective film is given by equation 1 below.
[MATHEMATICAL 1]

$$n1=(n(\text{glass}) \times n(\text{air}))^{1/2} \qquad \text{(Equation 1)}$$

Substituting n(glass)=1.5 and n(air)=1 into this equation 1, the refractive index n1 of the antireflective film is given as 1.22. An ideal substance having such a low refractive index and capable of depositing a thin and durable film layer is virtually nonexistent. However, the refractive index of magnesium fluoride is 1.38, and this value is sufficient for the purpose.

Accordingly, the first and second magnesium fluoride films 11 and 112 satisfy the condition necessary to prevent reflections at the glass surface, and when the first and second magnesium fluoride films 111 and 112 are each formed to the thickness of $(2N+1)\lambda/(4n(\text{magnesium fluoride}))$ (where $\lambda$ is the wavelength of the incident light beam, N is an integer not smaller than 0, and n(magnesium fluoride) is the refractive index of magnesium fluoride), the first and second magnesium fluoride films 111 and 112 function as antireflective films.

Next, the first and second alumina films 112 and 113 will be described. The first and second alumina films 113 and 114 are provided to prevent reflections of the incident beam between the first glass 20 and the first ITO film 21 and between the second glass 28 and the third ITO film 27, respectively. Denoting the refractive index of the ITO film by n(ITO), the refractive index n2 of the antireflective film is given by equation 2 below.
[MATHEMATICAL 2]

$$n2=(n(\text{glass}) \times n(ITO))^{1/2} \qquad \text{(Equation 2)}$$

Substituting n(glass)=1.5 and n(ITO)=2 into this equation 2, the refractive index n2 of the antireflective film is given as 1.73. Here, the refractive index of the alumina film is 1.68, which satisfies the condition necessary to prevent reflections between glass and ITO film, and when each alumina film is formed to the thickness of $(2N+1)\lambda/(4n(\text{alumina}))$ (where $\lambda$ is the wavelength of the incident light beam, N is an integer not smaller than 0, and n(alumina) is the refractive index of alumina), the first and second alumina films 112 and 113 function as antireflective films.

Next, the third and fourth alumina films 114 and 115 will be described. The third and fourth alumina films 114 and 115 are provided to prevent reflections of the incident beam between the first ITO film 21 and the first polyvinyl alcohol film 22 and between the second ITO film 25 and the second polyvinyl alcohol film 24, respectively.

Since the polyvinyl alcohol film has approximately the same refractive index as the liquid crystal, the polyvinyl alcohol film can be regarded as the same substance as the liquid crystal 29 in terms of refractive index. Therefore, reflections only between the ITO film and the polyvinyl alcohol film are considered here. Denoting the refractive index of the polyvinyl alcohol film by n(polyvinyl alcohol), the refractive index n3 of the antireflective film is given by equation 3 below.
[MATHEMATICAL 3]

$$n3=(n(ITO) \times n(\text{polyvinyl alcohol}))^{1/2} \qquad \text{(Equation 3)}$$

Substituting n(ITO)=2 and n(polyvinyl alcohol)=1.5 into this equation 3, the refractive index n3 of the antireflective film is given as 1.73. Here, the refractive index of the alumina film is 1.68, which satisfies the condition necessary to prevent reflections between ITO film and alignment film, and when each alumina film is formed to the thickness of $(2N+1)\lambda/(4n(\text{alumina}))$ (where $\lambda$ is the wavelength of the incident light beam, N is an integer not smaller than 0, and n(alumina) is the refractive index of alumina), the third and fourth alumina films 114 and 115 function as antireflective films.

On the other hand, reflections do not occur at the interface between the tantalum oxide film and the ITO film, since their refractive indices are substantially equal as noted in the first embodiment.

As described above, by forming the magnesium fluoride film on each glass, and by providing the alumina film between each glass and each ITO film and also between each ITO film and each polyvinyl alcohol film, reflections within the optical element can, in effect, be prevented perfectly. Also, by providing a plurality of aberration correcting electrodes on the same side of the substrate, an optical element thin in construction and capable of correcting a plurality of aberrations simultaneously can be implemented at low cost.

Further, by forming the insulating film from a material having the same refractive index as the ITO film, light losses can be reduced, increasing the efficiency of utilization of light. Furthermore, by using the solgel method for the formation of the insulating film, a low cost fabrication method can be achieved.

Further, when the above optical element is used in the optical head, since the margin for tilt increases, it becomes easier to adjust the component parts of the optical head, facilitating the fabrication of the optical head. Accordingly, an optical head having a large tilt margin can be implemented at low cost.

Further, the optical head capable of correcting for a plurality of aberrations can be made thin and compact in construction. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial and tangential directions). Moreover, since the optical head itself is low cost and suitable for thin construction, the optical recording/reproduction apparatus can also be made low cost and thin in construction.

The present embodiment has been described as using magnesium fluoride or alumina as the material for the antireflective film of the invention, but other material may be used as long as the material has the desired refractive index.

In the present embodiment, four interlayer reflection preventing films are necessary because the alignment of the liquid crystal is controlled using polyvinyl alcohol films treated with rubbing, but if grooves are formed on the glass substrate to control the alignment of the liquid crystal, only two interlayer reflection preventing films need be provided, one between the glass and the aberration correcting electrode and the other between the glass and the counter electrode, since the alignment films can be omitted.

Furthermore, in the present embodiment, the antireflective film of the invention has been described as being a single-layer antireflective film, but the structure is not limited to this particular one; for example, a multi-layer anti-reflective film may be used.

In the above-described embodiments, three electrodes are provided for aberration correction, one below the liquid crystal layer and two above it, but the invention is not limited to this particular example, and three or more electrodes may be provided above the liquid crystal layer. That is, any electrode, if it has portions facing the liquid crystal layer through the openings formed in other electrodes, can apply prescribed voltages to the liquid crystal for aberration correction.

Here, the outermost electrode need not necessarily be provided with openings.

Each of the above embodiments has been described as correcting two kinds of aberrations but, by increasing the number of aberration correcting electrodes and insulating films, it becomes possible to correct a plurality of aberrations simultaneously (for example, three aberrations, i.e., coma caused by radial tilt, coma caused by tangential tilt, and spherical aberration caused by variations in the substrate thickness of the optical recording medium).

Embodiment 4

A fourth embodiment of the present invention will be described below with reference to drawings. This embodiment differs from the previously described first embodiment only in the structure of the optical element; otherwise, the present embodiment is the same as the first embodiment. In the present embodiment, therefore, the construction is the same as that of the first embodiment unless specifically indicated otherwise, and component members designated by the same reference numerals as those in the first embodiment are the same in function as the corresponding members in the first embodiment, unless specifically noted otherwise.

Figure 15:
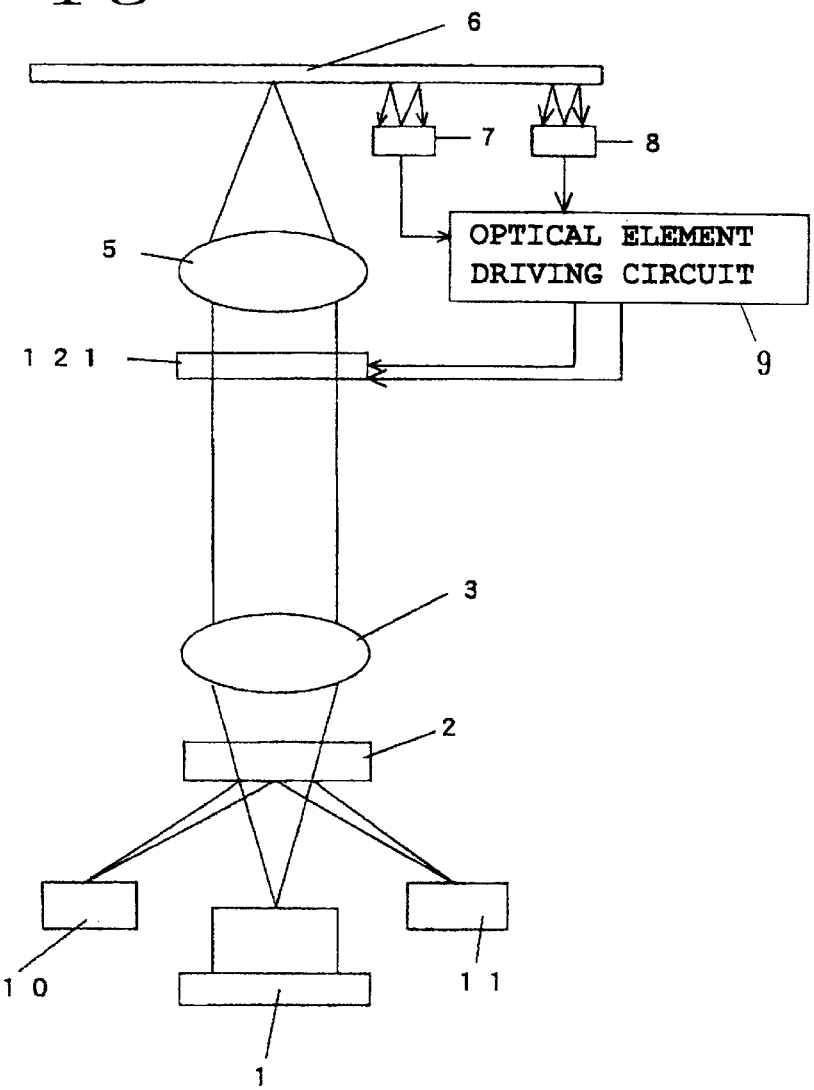
FIG. 15 is a diagram showing the construction of another embodiment of an optical head according to the present invention.

FIG. 15 is a diagram showing the construction of an optical head according to the fourth embodiment of the present invention. Reference numeral 121 indicates a second [sic] optical element according to the present invention.

The optical element 121, designated as the fourth optical element of the invention, is a device that corrects the coma caused when the optical recording medium 6 is tilted in the radial direction and also the coma caused when it is tilted in the tangential direction; the details of this device will be described later.

The operation of the thus constructed optical head will be described with reference to FIG. 15. A portion of the linearly polarized light emitted from the light source 1 passes through the diffraction grating 2 and enters the collimator lens 3, from which the light emerges as a parallel beam of light and enters the optical element 121.

Here, if the optical recording medium 6 is tilted from the normal in the radial direction relative to the optical axis, the first tilt sensor 7 outputs a signal corresponding to the radial tilt angle, and if it is tilted from the normal in the tangential direction relative to the optical axis, the second tilt sensor 8 outputs a signal corresponding to the tangential tilt angle; each of these signals is input to the optical element driving circuit 9 which then outputs the necessary signal to generate such a wavefront aberration that compensates for the wavefront aberration caused when the optical recording medium 6 is tilted, and this signal is input to the optical element 121.

Then, the light entering the optical element 121, as it passes through the optical element 121, is given the wavefront aberration that compensates for the wavefront aberration caused when the optical recording medium 6 is tilted. The light passed through the optical element 121 is focused onto the optical recording medium 6 by means of the objective lens 5.

Here, since the light having the wavefront aberration that compensates for the wavefront aberration caused when the optical recording medium 6 is tilted is focused through the objective lens 5, a light spot free from aberrations and thus focused to the diffraction limit is formed on the optical recording medium 6. Next, the light reflected from the optical recording medium 6 emerges with a wavefront aberration proportional to the tilt of the optical recording medium 6, but this wavefront aberration is corrected for by the optical element 121. The light passed through the optical element 121 passes through the collimator lens 3 and is diffracted by the diffraction grating 2, which directs the + first order beam of the diffraction to the photodetector 10 and the − first order beam of the diffraction to the photodetector 11. The photodetector 10 outputs a focus error signal indicating the focusing condition of the light on the optical recording medium 6, and also outputs a tracking error signal indicating the position of the light shone thereon.

One of these signals is supplied to focus control means not shown and, based on the focus error signal, the focus control means controls the position of the objective lens 5 along its optical axis so that the light is always kept in focus on the optical recording medium 6. On the other hand, tracking control means not shown controls the position of the objective lens 5 based on the tracking error signal so that the light is kept focused on the desired track on the optical recording medium 6. The information recorded on the optical recording medium 6 is obtained from the second photodetector 11.

Figure 16:
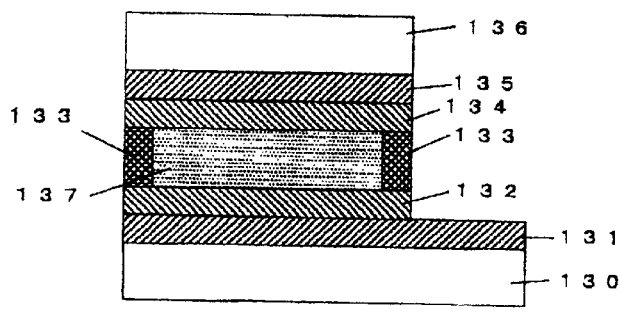
FIG. 16 is a cross sectional view showing another embodiment of an optical element according to the present invention.

Next, the fourth optical element 121 of the present invention will be described in detail. FIG. 16 is a cross sectional view of the optical element according to the first embodiment[sic] of the present invention. In FIG. 16, reference numeral 131 is a first ITO film (Indium Tin Oxide alloy) 135 is a second ITO film, and 137 is a PLZT (transparent crystal having a perovskite structure of lead oxide, lanthanum, zirconium oxide, and titanium oxide).

Here, the first ITO films 131 and 135[sic] are transparent electrodes via which external signals are applied to the PLZT 137 and through which light is transmitted. The first ITO film 131 is formed with the pattern shown in FIG. 3 and the second ITO film 135 with the pattern shown in FIG. 4 (these patterns will be described later).

The optical element of the present embodiment functions as an aberration correcting element: the first ITO film 131 corresponds to the first aberration correcting electrode of the invention, the second ITO film 135 corresponds to the second aberration correcting electrode of the invention, and the liquid crystal 137 corresponds to the phase change layer of the invention.

Next, the method for correcting tilt-induced coma will be described. For patterns used to correct tilt-induced coma, the pattern shown in FIG. 3 should be used when correcting the coma caused by the radial tilt, and the pattern shown in FIG. 4 should be used when correcting the coma caused by the tangential tilt, as described in the first embodiment; therefore, the pattern shown in FIG. 3 is adopted for the first ITO film 131 and the pattern shown in FIG. 4 is used for the second ITO film 135.

For example, consider the case where the optical recording medium 6 is tilted only in the radial direction. In this case, external voltages are applied to the first and second ITO films 131 and 135, applying different electric fields across the liquid crystal in desired positions (regions A, B, and C in FIG. 3) and thus changing the phases of the desired positions to correct for the coma caused by the radial tilt.

The method of voltage application will be described below. As can be seen from FIG. 5, for example, all the regions D, E, and F of the second ITO film 135 are grounded (supplied with 0V), and V1−Va is applied to the region A of the first ITO film 131, V1 is applied to the region B of the first ITO film 131, V1+Va is applied to the region C of the first ITO film 131, thus setting the refractive indices of the liquid crystal 137 in the respective regions to na, nb, and nc so that the regions A and C provide positive and negative phases relative to the region B; in this way, a phase distribution compensating for the phase distribution shown in FIG. 23 can be provided.

Next, consider the case where the optical recording medium 6 is tilted only in the tangential direction. In this case, 0 V is applied externally to all the regions A, B, and C of the first ITO film 131, and V2−Vb is applied externally to the region D of the second ITO film 135, and V1+Va is applied externally to the region C of the second ITO film 135, and V2+Vb is applied externally to the region F of the second ITO film 135, thus setting the refractive indices of the liquid crystal 137 in the respective regions to nd, ne, and nf so that the regions D and F provide positive and negative phases relative to the region E; by so doing, the coma caused by the tangential tilt can be corrected.

However, the situation is different if the optical recording medium 6 is tilted in both the radial and tangential directions, and if the coma caused by the radial tilt and the coma caused by the tangential tilt are to be corrected simultaneously.

Figure 17:
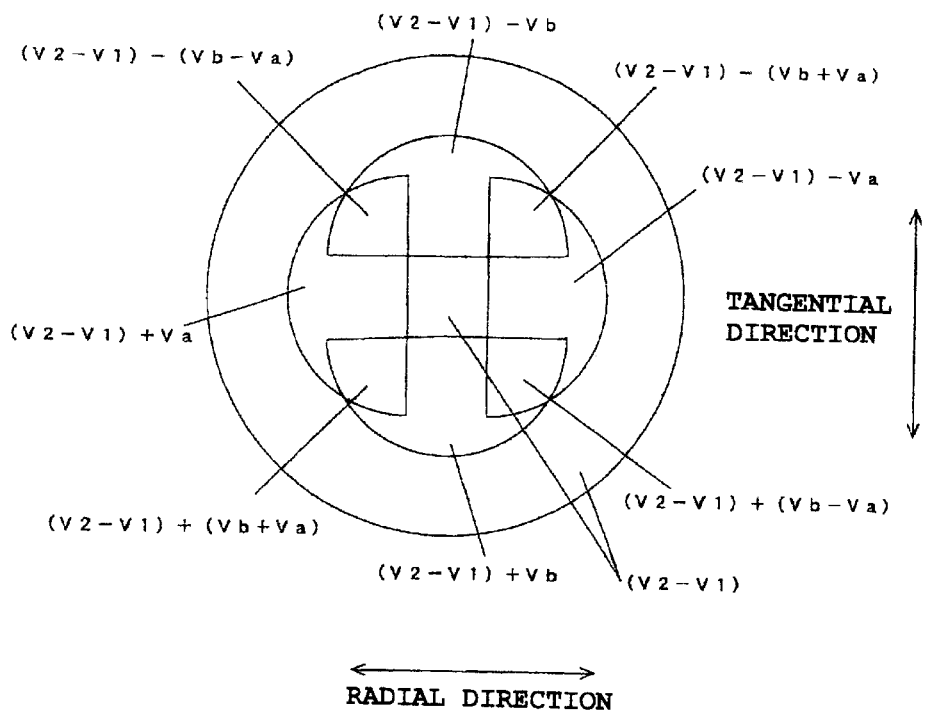
FIG. 17 is a diagram showing voltages applied to liquid crystal 137 in the in the optical element of the present invention.

In this case, V1−Va is applied to the region A of the first ITO film 131, V1 is applied to the region B of the first ITO film 131, and V1+Va is applied to the region C of the first ITO film 131, and V2−Vb is applied to the region D of the second ITO film 135, and V2 is applied to the region E of the second ITO film 135, and V2+Vb is applied to the region F of the second ITO film 135. As a result, the voltages shown in FIG. 17 are applied to the liquid crystal 137. As can be seen, the coma caused by the radial tilt can be mostly corrected by the region (the reference region) where V2−V1 is applied, the region (the region of the negative phase) where (V2−V1)−Va is applied, and the region (the region of the positive phase) where (V2−V1)+Va is applied, and also, the coma caused by the tangential tilt can be mostly corrected by the region (the reference region) where V2−V1 is applied, the region (the region of the negative phase) where (V2−V1)−Vb is applied, and the region (the region of the positive phase) where (V2−V1)+Vb is applied. The remaining regions (four regions consisting of the region where (V2−V1)−(Vb+Va) is applied, the region where (V2−V1)−(Vb−Va) is applied, the region where (V2−V1)+(Vb+Va) is applied, and the region where (V2−V1)+(Vb−Va) is applied) are under the influence of the coma caused by both the radial and tangential tilts, and their positions are under the influence of the voltages for correcting both tilts; therefore, the correcting effect is further enhanced.

Here, the first ITO film is supplied with voltages V1+Va and V1−Va, which means that only two external voltages V1+Va and V1−Va need to be supplied, and V1 can be derived from these two voltages. Likewise, the 22nd [sick] ITO film is supplied with voltages V2+Vb and V2−Vb, which means that only two external voltages V2+Vb and V2−Vb need to be supplied, and V2 can be derived from these two voltages. Accordingly, a total of four external voltages need be applied to the first and second ITO films combined. V1 and V2 can be derived using, for example, thin film resistors formed in an optically non-transmissive region of the optical element.

An optical element for correcting two aberrations simultaneously by forming patterns on both the upper and lower surfaces of the liquid crystal is described in Japanese Laid-open No. 11-110802. In this case, since the material used for phase change purposes is a liquid, a liquid sealing means, such as two glass sheets and a sealing layer as shown, for example, in FIG. 2, becomes necessary. By contrast, in the optical element of the present invention, since the phase change layer is a solid, no sealing means is required; this not only contributes to reducing the thickness of the optical element itself but also facilitates the fabrication of the optical element.

By arranging a solid PLZT between aberration correcting electrodes, as described above, an optical element thin in construction and capable of correcting a plurality of aberrations simultaneously can be implemented at low cost.

It will also be noted that, compared with the optical element of the first embodiment, the optical element of the present embodiment provides a high aberration correction effect because it uses a complete pattern for aberration correction (whereas the optical element of the first embodiment uses a pattern having void portions).

Furthermore, when this optical element is used in the optical head, since the margin for tilt increases, it becomes easier to adjust the component parts of the optical head, facilitating the fabrication of the optical head. Accordingly, an optical head having a large tilt margin can be implemented at low cost. Further, the optical head capable of correcting for a plurality of aberrations can be made thin and compact in construction. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial and tangential directions). Moreover, since the optical head itself is low cost and suitable for thin construction, the optical recording/reproduction apparatus can also be made low cost and thin in construction.

It will also be appreciated that if the optical element of the present embodiment is also provided with antireflective films, the efficiency of light utilization further improves, offering an added advantage.

The above fourth embodiment has been shown as arranging one electrode on either side of the PLZT layer, but if electrodes having void patterns as earlier described are used, more than one electrode can be arranged on either side.

The embodiments of the present invention has been described above by way of example, but the invention is not limited to the particular embodiments given above but can also be carried out in other embodiments based on the technical idea of the invention.

For example, in the first to third embodiments described above, liquid crystal has been used as the material for changing the phase of light, but it will be recognized that the phase of light can also be changed by using a material, such as a PLZT (transparent crystal having a perovskite structure of lead oxide, lanthanum, zirconium oxide, and titanium oxide), whose thickness varies according to the applied voltage.

Figure 18:
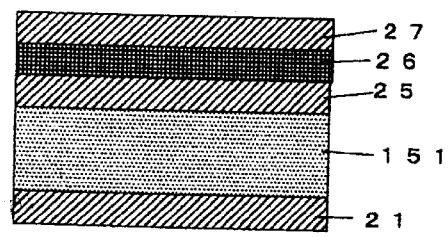
FIG. 18 is a cross sectional view showing another embodiment of an optical element according to the present invention.
Figure 19:
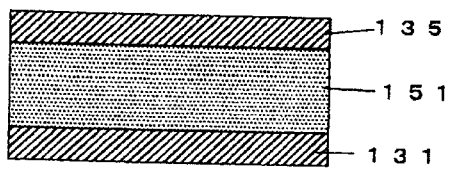
FIG. 19 is a cross sectional view showing another embodiment of an optical element according to the present invention.
Figure 20:
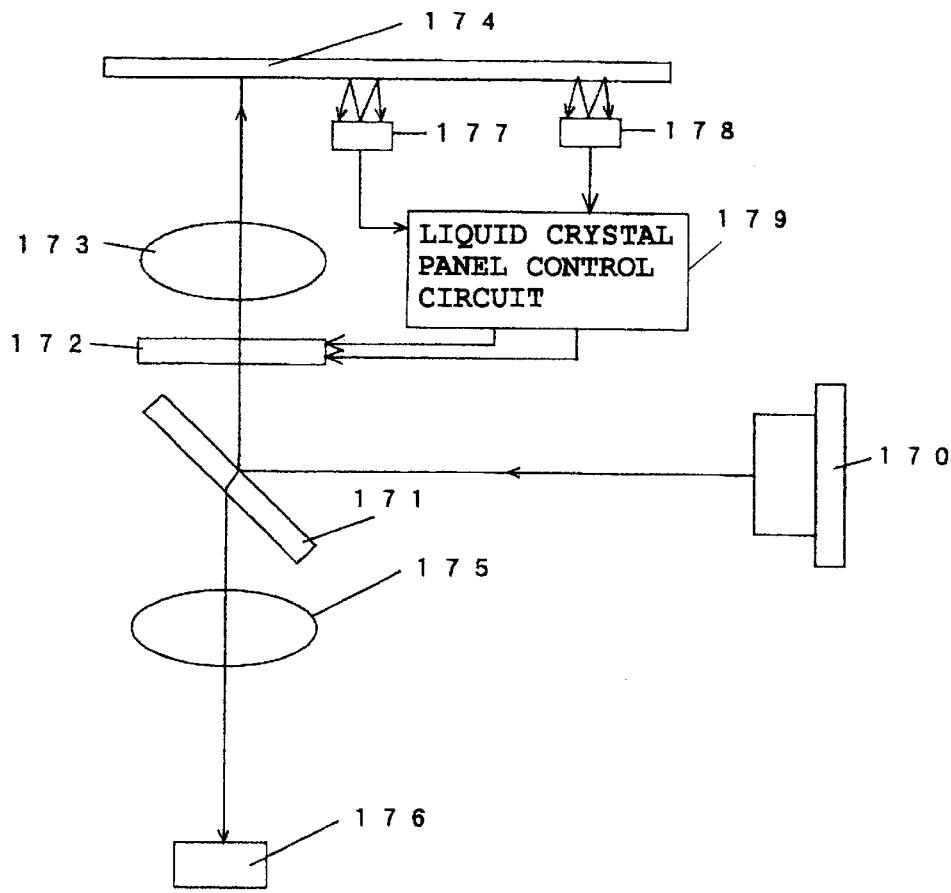
FIG. 20 is a diagram showing the construction of one example of a prior art optical head.

Japanese Laid-open No. 5-144056 proposes using this material for aberration correction. When this material is used, the optical element of the present invention can be structured as shown, for example, in FIG. 18 or 19. In FIGS. 18 and 19, reference numeral 151 is the PLZT, and other members that are the same as those in the optical elements of the first and fourth embodiments are designated by the same reference numerals.

This optical element has the disadvantage that a high applied voltage is needed to cause the phase to change, because the phase change layer is a substrate made of an inorganic material; however, since transparent electrodes can be formed on the upper and lower surface of it, the thickness of the optical element can be further reduced and, if this optical element is used in the optical head, the construction can be made further compact and thin.

In the optical elements of the above-described embodiments, ITO films have been used as the transparent electrodes, but any other film can be used without problems as long as the film is optically transmissive and electrically conductive.

Further, in the optical elements of the above-described embodiments, a rubbing method which rubs the polyvinyl alcohol film with a cloth has been used as a method for controlling the alignment of the liquid crystal 28[sic], but if other method is used, for example, a method that uses an obliquely evaporated film or the like in which the film itself is provided with orientation or a method that forms grooves in the substrate, there will be no problem.

Further, in the optical elements of the above-described embodiments, a tantalum oxide film has been used as the insulating film, but any other film can be used without problems as long as the film has the same refractive index as the transparent electrode. It will also be possible to use a material having a different refractive index than that of the transparent electrode on the condition that the film thickness be set equal to an integral multiple of $\lambda/2 \times N(\text{insulating film})$ (where $\lambda$ is the wavelength and N(insulating film) is the refractive index of the insulating film), because optically this is equivalent to making this film disappear and, as a result, reflections do not occur at the interface between the transparent electrode and the insulating film.

Each of the above embodiments has been described as using nonpolarizing optics, but polarizing optics may be used, such as a polarizing prism or a polarizing hologram (see Japanese Laid-open No. 63-314502). In that case, optical recording is made easier because the efficiency of light utilization in the return path increases.

Further, each of the above embodiments has been described as arranging the optical element of the present invention in the collimated light path between the collimator lens and the objective lens, but the optical element may be arranged in the diverging light path between the light source and the collimator lens.

In the above embodiments, the optical head has been shown as comprising infinite optics, but an optical head comprising finite optics that do not uses a collimator lens may be used. In that case, since the collimator lens is not used, the cost can be reduced correspondingly.

In each of the above embodiments, wavefront aberration correction is done using the amount of tilt detected by the tilt sensor during playback of the information recorded on the optical recording medium, but instead, the relationship between the track position and the tilt amount may be learned before playback, and the wavefront aberration at each track position may be corrected based on the thus learned tilt amount.

Furthermore, in each of the above embodiments, the reflected light from the optical recording medium is directed to the photodetectors by separating it from the optical path of the light source by means of the diffraction grating, but a splitting optical element such as a half mirror may be used to direct the light to the photodetectors by separating it from the optical path of the light source.

Each of the above embodiments has been described dealing with an optical recording/reproduction apparatus that reproduces or records information on an optical recording medium containing two kinds of defects, but since an optical head that can correct three or more kinds of aberrations can be constructed as described above, it will be appreciated that the present invention can achieve an optical recording/reproduction apparatus that can reproduce or record information on an optical recording medium containing any kind of defect.

Furthermore, each of the above embodiments has been described dealing with the case where the optical recording medium is an optical disc, but the present invention can also be applied to an optical information recording/reproduction apparatus implementing similar functions, such as a card type optical recording medium.

Hereinafter, embodiments of the present invention will be described with reference to drawings.

Embodiment 5

Figure 24:
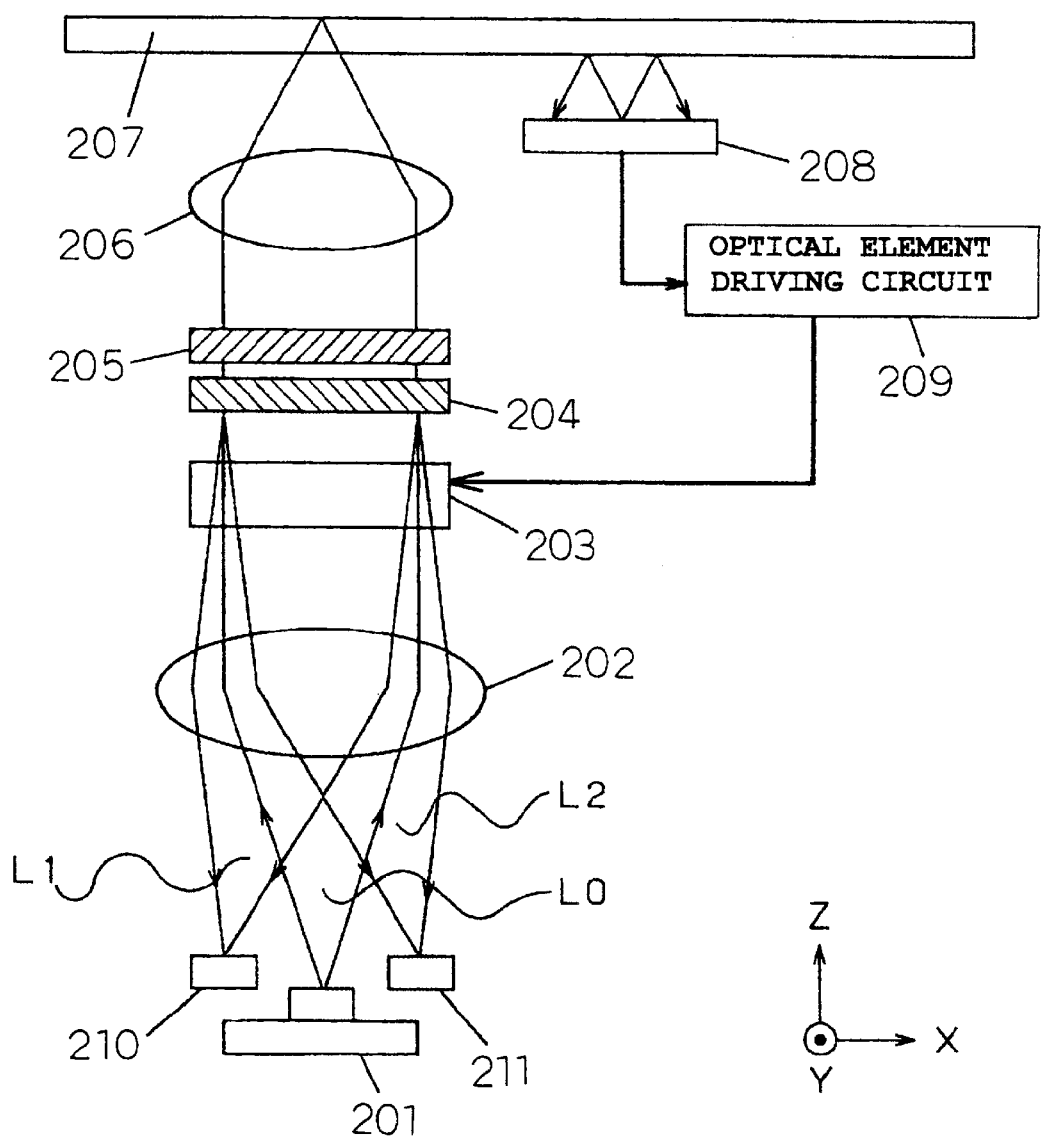
FIG. 24 is a diagram showing the construction of a fifth embodiment of an optical head according to the present invention.

FIG. 24 is a diagram showing the construction of an optical head according to a first[sic] embodiment of the present invention.

In FIG. 24, reference numeral 201 is a light source, 202 is a collimator lens, 203 is a first optical element (described in detail later) according to the present invention, 204 is an anisotropic polarizing hologram, 205 is a quarter wave plate, 206 is an objective lens, 207 is an optical recording medium, 208 is a tilt sensor, 209 is an optical element driving circuit, 210 is a first photodetector, and 211 is a second photodetector. converging optics consist of the collimator lens 2[sic] and the objective lens 206, a K-quarter wave plate is constructed from the quarter wave plate 205, and separating means consists of the anisotropic polarizing hologram 4[sic].

In the xyz coordinate system shown at the lower right of of the diagrams given hereinafter, the same axis points in same direction throughout the respective diagrams.

The light source 201 is constructed, for example, from a semiconductor laser device, and outputs recording/playback coherent light directed to the recording surface of the optical recording medium 207. The optical element 203, designated as the first optical element of the present invention, is a device that corrects the wavefront aberration, especially coma, caused when the optical recording medium 207 is tilted in the radial direction; the details of this device will be described later.

The anisotropic polarizing hologram 204 transmits light polarized in a particular direction and diffracts light polarized at right angles to that particular direction (see Japanese Laid-open No. 63-314502). The quarter wave plate 205 changes the polarization state of the incident light. The objective lens 206 is a lens for focusing light onto the recording surface of the optical recording medium 207.

The first photodetector 210 is a device which, of the light reflected from the recording surface of the optical recording medium 207, receives the + first order beam diffracted by the anisotropic polarizing hologram 4[sic] and converts it into an electrical signal, and the second photodetector 211 is a device which, of the light reflected from the recording surface of the optical recording medium 207, receives the − first order beam diffracted by the anisotropic polarizing hologram 204 and converts it into an electrical signal.

The tilt sensor 208 is a sensor that detects the amount of tilt (radial tilt angle) when the optical recording medium 7[sic] is tilted from the normal in the radial direction relative to the optical axis, and that generates a signal proportional to the detected tilt angle, and the optical element driving circuit 209 is a circuit that applies a voltage to the optical element 203 in accordance with the signal generated by the tilt sensor 208.

The operation of the thus constructed optical head will be described with reference to FIG. 24.

The light source 201 is arranged so as to emit light L0 polarized in the x-axis direction in the xyz coordinate system shown at the lower right of FIG. 24; the emitted light enters the collimator lens 202 which converts the emitted light L0 into a parallel beam of light, and the parallel beam of light enters the optical element 203. Here, if the optical recording medium 207 is tilted from the normal in the radial direction relative to the optical axis, the tilt sensor 208 outputs the tilt signal corresponding to the radial tilt angle, and the signal is input to the optical element driving circuit 209 which then supplies the optical element 203 with such a signal that generates in the optical element 203 a phase distribution opposite to the wavefront phase distribution caused when the optical recording medium 207 is tilted; therefore, the light passing through the optical element 203 is given the opposite phase distribution.

The light passed through the optical element 203 enters the anisotropic polarizing hologram 204 which is oriented so as to transmit the light polarized in the x-axis direction, and the light polarized in the x-axis direction is passed unchanged and enters the quarter wave plate 205. The light L0 polarized in the x-axis direction is changed from linearly polarized light to circularly polarized light as it passes through the quarter wave plate 205, and the circularly polarized light is focused onto the recording surface of the optical recording medium 207 through the objective lens 206.

Since the light being focused here has the phase distribution opposite to the wavefront phase distribution caused when the optical recording medium 207 is tilted, a light spot substantially free from aberrations and thus focused to the diffraction limit is formed on the recording surface of the optical recording medium 207. The light emerging from the surface of the optical recording medium 207 is given the wavefront phase distribution corresponding to the tilt of the optical recording medium 207 again, and is reflected back through the same optical path into the quarter wave plate 205 where the light is converted into light polarized in the y-axis direction, and this polarized light enters the anisotropic polarizing hologram 204.

Of the return light, the + first order diffracted beam (L1) and the − first order diffracted beam (L2) emerge from the anisotropic polarizing hologram 204 and enter the optical element 203. Based on the signal generated by the optical element driving circuit 209 using the tilt signal from the tilt sensor 208, the optical element 203 is given the opposite phase distribution to the wavefront phase distribution of the diffracted beams L0 and L1, thus forming beams substantially free from aberrations. The diffracted beams L0 and L1 [sic] passed through the optical element 203 then pass through the collimator lens 202 and fall on the first photodetector 210 and the second photodetector 211, respectively.

These beams are detected by the first photodetector 210 and the second photodetector 211, each having a plurality of split regions, and servo signals and information signal can be obtained by performing calculations on the detected signals.

Next, the first optical element 203 of the present invention will be described in detail.

Figure 25:
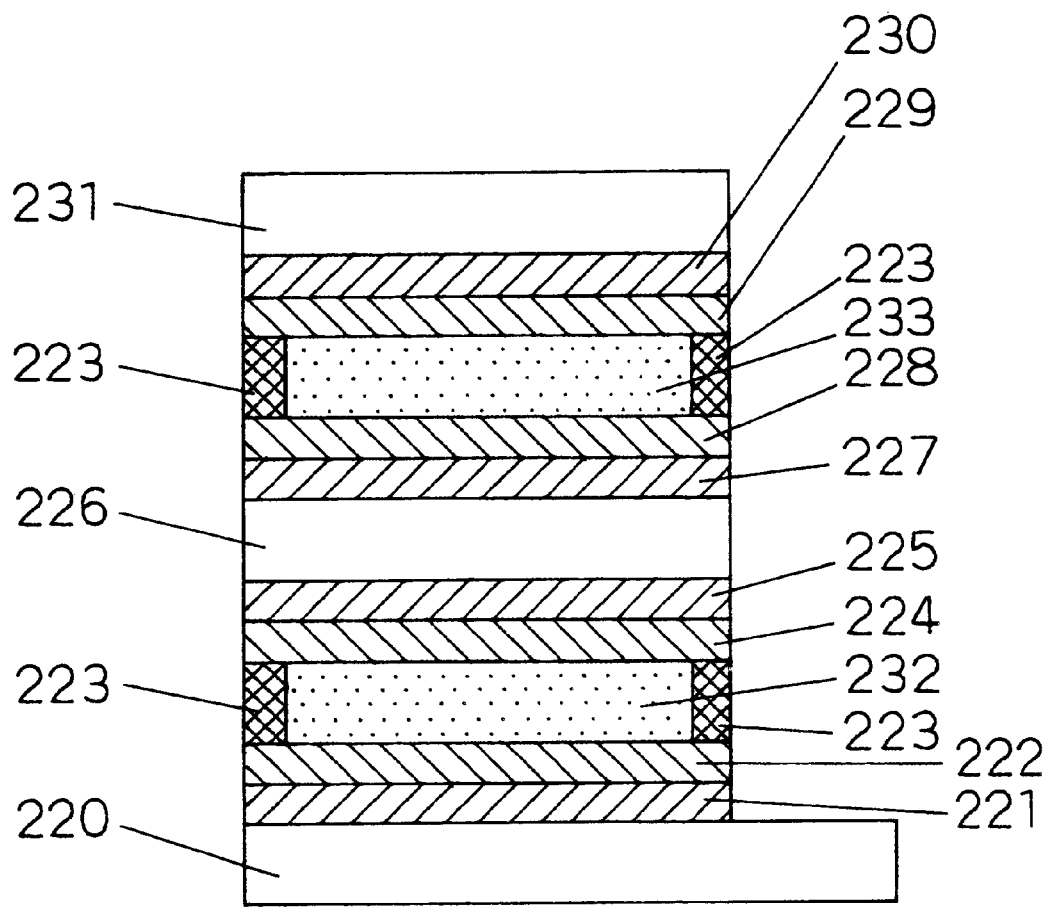
FIG. 25 is a cross sectional view showing a fifth embodiment of an optical element according to the present invention.

FIG. 25 is a cross sectional view of the optical element according to the fifth embodiment of the present invention. In FIG. 25, reference numeral 220 is first glass, 221 is a first ITO film (Indium Tin Oxide alloy), 222 is a first polyvinyl alcohol film, 223 is an epoxy resin, 224 is a second polyvinyl alcohol film, 225 is a second ITO film, 226 is second glass, 227 is a third ITO film, 228 is a third polyvinyl alcohol film, 229 is a fourth polyvinyl alcohol film, 230 is a fourth ITO film, 231 is third glass, 232 is a first liquid crystal, and 233 is a second liquid crystal. Here, the first, second, third, and fourth ITO films 221, 225, 227, and 230 are deposited on the inside surfaces of the glass, and function as transparent electrodes via which external signals are applied to the respective liquid crystals and through which light is transmitted; the first and second polyvinyl alcohol films 222 and 224 are deposited on the first and second ITO films 221 and 225, respectively, and the third and fourth polyvinyl alcohol films 228 and 229 are deposited on the third and fourth ITO films 227 and 230, respectively, wherein these polyvinyl alcohol films are rubbed with a nylon or other polymer cloth so they function as alignment films for controlling the alignment of the first and second liquid crystals 232 and 233; and the epoxy resin 223 forms a sealing layer for preventing the first and second liquid crystals 232 and 233 from leaking outside.

The second ITO film 221[sic] and the third ITO film 227 are deposited on the second glass 226, and the electrode pattern shown in FIG. 3 is formed on the first ITO film 221 as well as on the fourth ITO film 230 (these patterns will be described later).

The optical element according to the fifth embodiment of the present embodiment functions as an aberration correcting element: the second ITO film 225 corresponds to the first counter electrode of the invention, the first ITO film 221 corresponds to the first aberration correcting electrode of the invention, the third ITO film 227 corresponds to the second counter electrode of the invention, and the fourth ITO film 230 corresponds to the second aberration correcting electrode of the invention.

The method of correcting the coma associated with the radial tilt angle is implemented as previously described.

Next, the operation of the first optical element 203 of the present invention which corrects the coma using the above method will be described.

Figure 26:
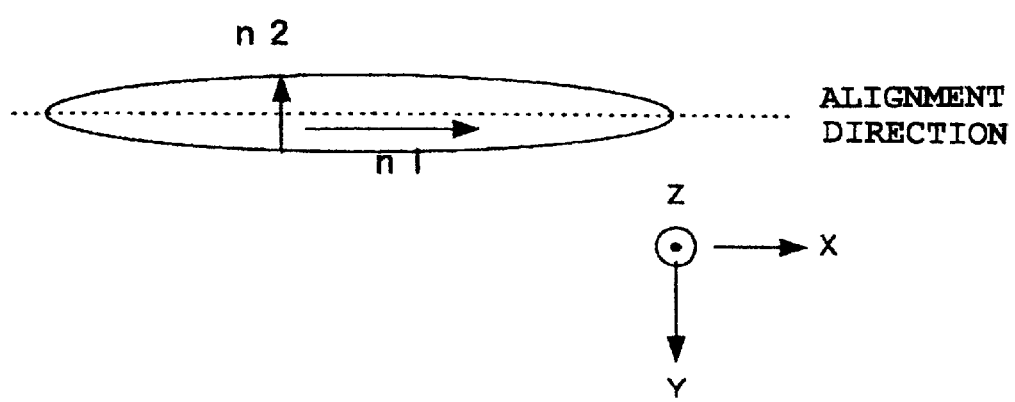
FIG. 26 is a diagram showing the alignment direction of first liquid crystal in the optical element of the present invention.
Figure 27:
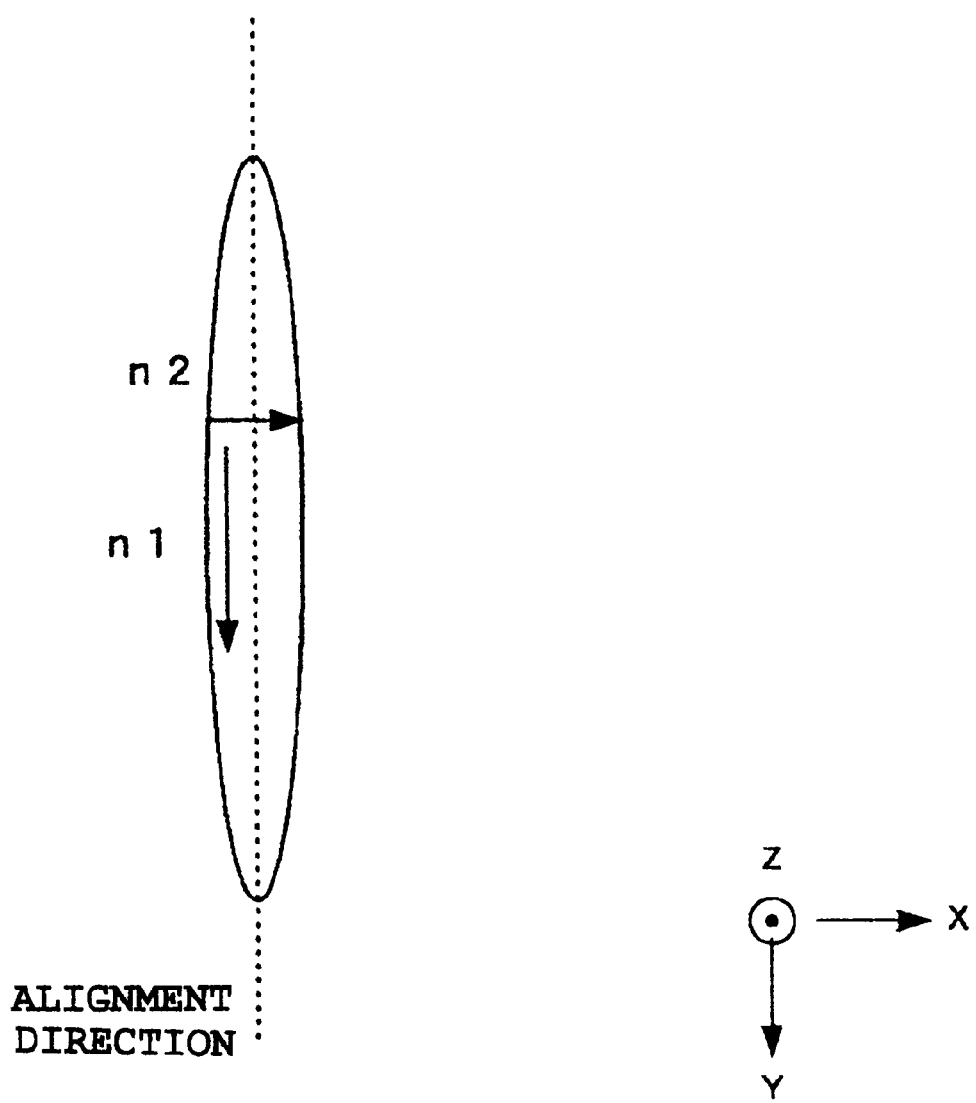
FIG. 27 is a diagram showing the alignment direction of 2nd liquid crystal in the optical element of the present invention.

First, consider the forward path. In the forward path, it is assumed that the optical element 203 is arranged so that the alignment direction (shown in FIG. 26) of the first liquid crystal 232 coincides with the polarization direction of the light L0 emitted from the light source 201 and polarized in the x-axis direction, and so that the alignment direction (shown in FIG. 27) of the second liquid crystal 233 is oriented in the y-axis direction, i.e., at right angles to the alignment direction of the first liquid crystal 232.

When the light L0 polarized in the x-axis direction, emitted from the light source 1, enters the optical element 203, if the optical recording medium 207 is tilted from the normal in the radial direction relative to the optical axis, the tilt sensor 208 outputs the tilt signal corresponding to the radial tilt angle, and the signal is input to the optical element driving circuit 209; thereupon, the optical element driving circuit 209 applies signals to the first and fourth ITO films 221 and 230 of the optical element 203 such that the opposite phase distribution is generated that cancels the wavefront phase distribution caused when the optical recording medium 207 is tilted. At the same time, the optical element driving circuit 209 applies 0 V to the second and third ITO films 225 and 227 of the optical element 203.

The first and fourth ITO films 221 and 230, to which the above signals are applied, are each split into regions in accordance with the electrode pattern shown in FIG. 3, and V1−Va is applied to the region A, and V1+Va is applied to the region B, and V1 is applied to the region C, so that the refractive indices of the first and second liquid crystals 232 and 233 in the respective regions are na, nb, and nc, respectively, as shown in FIG. 5, and so that the regions A and B have positive and negative phases relative to the region C; as a result, the phase distribution opposite to the phase distribution shown in FIG. 23 can be given to the incident light. At this time, since the alignment direction of the first liquid crystal 232 coincides with the light L0 emitted from the light source 1[sic] and polarized in the x-axis direction, the first liquid crystal 232 gives the light L0 the phase distribution opposite to the phase distribution shown in FIG. 23 in accordance with the signals applied from the optical element driving circuit 209.

Next, the light L0 is not given a phase distribution and passes through the second liquid crystal 233 with its phase distribution unchanged, since the alignment direction of the second liquid crystal 233 is oriented at right angles to the polarization direction of the light. Accordingly, the light is focused as a light spot on the recording surface of the optical recording medium 207 through the objective lens 206 and becomes substantially free from aberrations as it passes through the first liquid crystal 232.

Next, consider the return path. In the return path, the light reflected from the optical recording medium 207 is converted into the diffracted beams L1 and L2 polarized in the y-axis direction as it passes through the quarter wave plate 205 and the anisotropic polarizing hologram 4[sic], and these beams enter the optical element 203. At this time, since the optical recording medium 207 is tilted from the normal in the radial direction relative to the optical axis, the reflected light from the optical recording medium 207 has the phase distribution shown in FIG. 23.

At this time, since the alignment direction of the second liquid crystal 233 coincides with the polarization direction of the diffracted beams L1 and L2, the second liquid crystal 233 gives the diffracted beams L1 and L2 the phase distribution opposite to the phase distribution shown in FIG. 23 in accordance with the signals from the optical element driving circuit 209.

Next, the diffracted beams L1 and L2 are not given phase distributions and pass through the first liquid crystal 233 with their phase distribution unchanged, since the alignment direction of the first liquid crystal 232 is oriented at right angles to the polarization direction of the diffracted beams. Accordingly, the reflected light from the recording surface of the optical recording medium 7[sic] becomes substantially free from aberrations by virtue of the second liquid crystal 233, and the diffracted beams passed through the collimator lens 2[sic] fall on the first photodetector 210 and the second photodetector 211, respectively.

The above embodiment has been described as using liquid crystal layers, but the invention is not limited to using liquid crystal layers, and PLZT or other layers may be used, the only requirement being that the layers be capable of changing the phase.

In that case, the first phase change layer is oriented so as to change the phase of linearly polarized light polarized in a particular direction, and the second phase change layer is oriented so as to change the phase of linearly polarized light polarized at right angles to the linearly polarized light polarized in that particular direction. PLZT can be used as a phase change layer since not only its volume but also its refractive index changes under the influence of an applied electric field.

Since aberrations in the return path can thus be corrected by the first optical element 203 of the present invention, the sidelobes of the light spot caused by the wavefront aberration associated with the radial tilt angle of the optical recording medium 207 as previously described, do not occur, and the light spot falling on the photodetector has the pattern shown in FIG. 23; as a result, the amount of light falling on each region of the photodetector does not change, and no offset occurs in the focus error signal.

As described above, when the optical element containing liquid crystal having the same electrode pattern and oriented at right angles to each other is used in the polarizing optical head, the aberration associated with the radial tilt angle of the optical recording medium can be corrected in both the forward and return paths, and stable servo signals and information signal can be obtained. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial direction).

Embodiment 6

A sixth embodiment of the present invention will be described below with reference to drawings. This embodiment differs from the foregoing fifth embodiment only in that the optical element 203 is provided with antireflective films; otherwise, the present embodiment is the same as the fifth embodiment. In the present embodiment, therefore, the construction is the same as that of the fifth embodiment unless specifically indicated otherwise, and component members designated by the same reference numerals as those in the fifth embodiment are the same in function as the corresponding members in the fifth embodiment, unless specifically noted otherwise.

Figure 28:
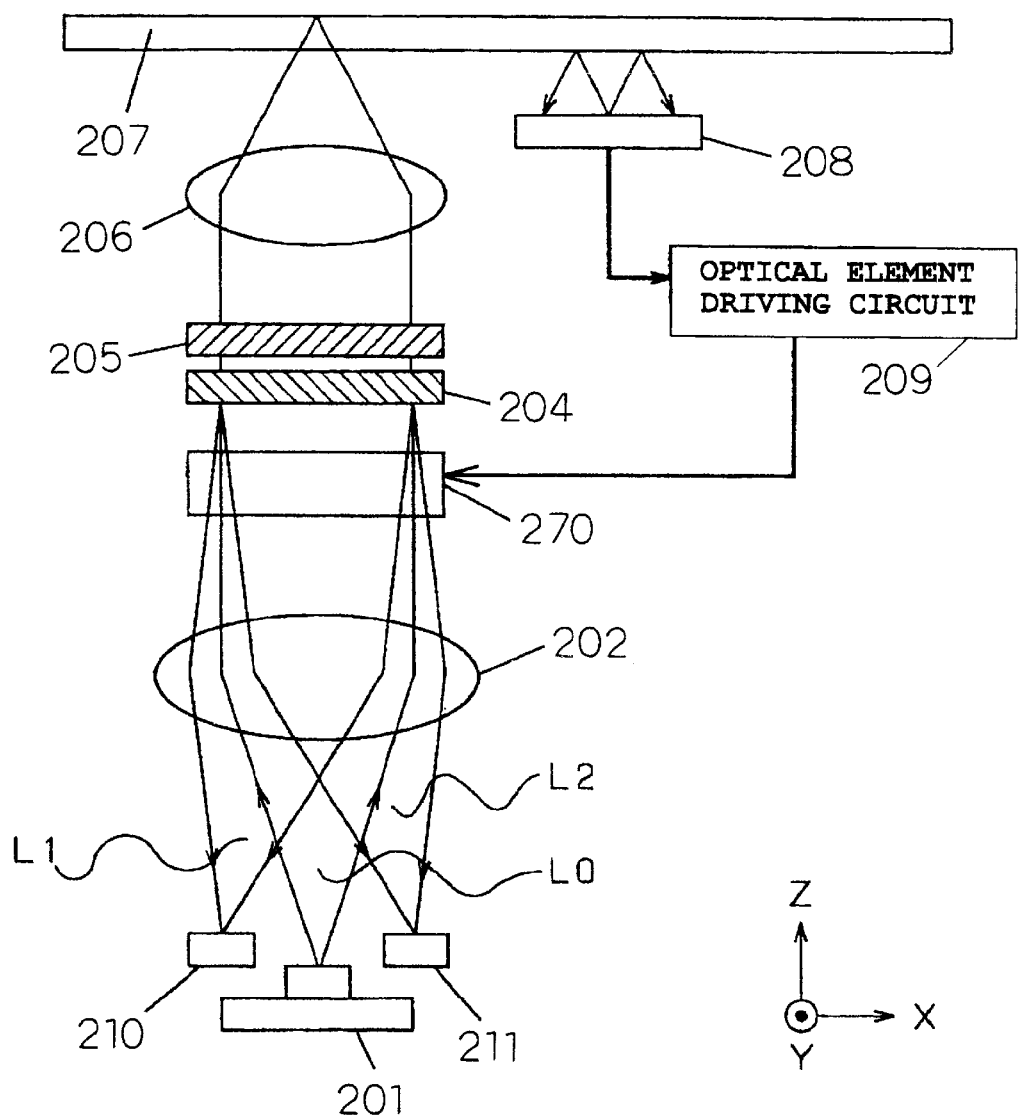
FIG. 28 is a diagram showing the construction of a sixth embodiment of an optical head according to the present invention.

FIG. 28 is a diagram showing the construction of an optical head according to the sixth embodiment of the present invention. Reference numeral 270 indicates a second optical element according to the present invention. The optical element 270 here is the first optical element 203 of the present invention with antireflective films. The operation of the thus constructed optical head is exactly the same as that described in the first embodiment[sic], and will not be described here in detail.

Figure 29:
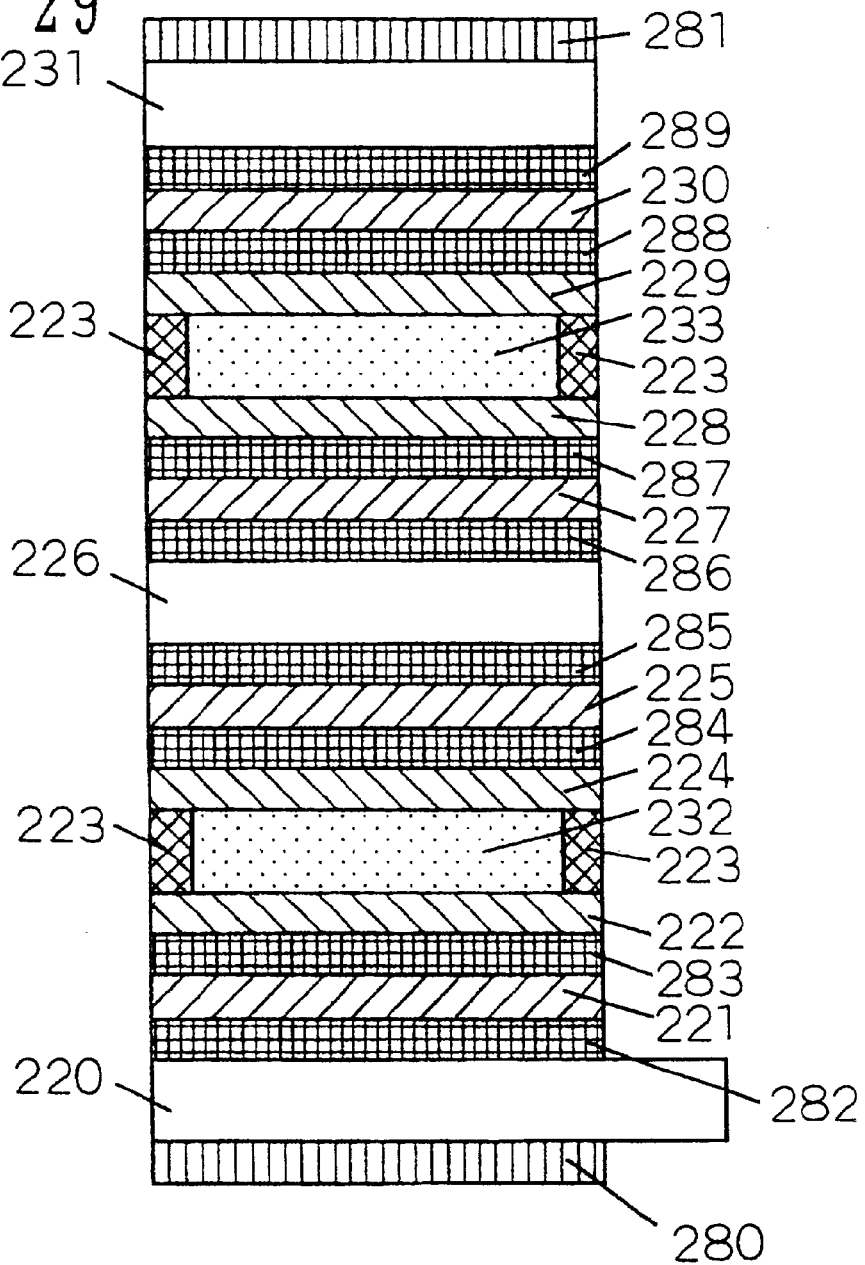
FIG. 29 is a cross sectional view showing a sixth embodiment of an optical element according to the present invention.

The second optical element 270 of the present invention will be described below. FIG. 29 is a cross sectional view of the optical element 270 according to the sixth embodiment of the present invention. The optical element 270 of this embodiment functions as an aberration correcting element, and is fabricated, as shown in FIG. 29, by forming a first magnesium fluoride film 280 and a second magnesium fluoride film 281 (each corresponding to the antireflective film of the present invention) on the first glass 220 and the third glass 231, respectively, of the optical element 203 of the fifth embodiment, and also forming a first alumina film 282 between the first glass 220 and the first ITO film 221, a second alumina film 83[sic] between the first ITO film 221 and the first polyvinyl alcohol film 222, a third alumina film 84[sic] between the second polyvinyl alcohol film 224 and the second ITO film 225, a fourth alumina film 285 between the second ITO film 225 and the second glass 226, a fifth alumina film 286 between the second glass 226 and the third ITO film 227, a sixth alumina film 287 between the third ITO film 227 and the third polyvinyl alcohol film 228, a seventh alumina film 288 between the fourth polyvinyl alcohol film 229 and the fourth ITO film 230, and an eighth alumina film 289 between the fourth ITO film 230 and the third glass 231 (each alumina film corresponds to the antireflective film of the present invention).

The antireflective films given herein are the same as those described in the previously described embodiment.

As described above, by forming the magnesium fluoride film on each glass, and by providing the alumina film between each glass and each ITO film and also between each ITO film and each polyvinyl alcohol film, reflections within the element can, in effect, be prevented perfectly.

Further, when the above optical element is used in the optical head, since the margin for tilt increases, it becomes easier to adjust the component parts of the optical head, facilitating the fabrication of the optical head. When this optical head is used in an optical recording/reproduction apparatus which reproduces or records information on an optical recording medium by controlling the optical head based on the control signals output from the optical head, information can be reliably reproduced or recorded on the optical recording medium even when the optical recording medium is defective (warped in the radial direction).

The present embodiment has been described as using magnesium fluoride or alumina as the material for the antireflective film of the invention, but other material may be used as long as the material has the desired refractive index.

Further, in the present embodiment, the antireflective film of the invention has been described as being a single-layer antireflective film, but the structure is not limited to this particular one; for example, a multi-layer antireflective film may be used.

The embodiments of the present invention has been described above by way of example, but the invention is not limited to the particular embodiments given above but can also be carried out in other embodiments based on the technical idea of the invention.

For example, in the optical elements of the above-described embodiments, ITO films have been used as the transparent electrodes, but any other film can be used without problems as long as the film is optically transmissive and electrically conductive.

Further, each of the above embodiments has been described as arranging the optical element of the present invention in the collimated light path between the collimator lens and the objective lens, but the optical element may be arranged in any position as long as it is located between the light source and the K-quarter wave plate.

In the above embodiments, the optical head has been shown as comprising infinite optics, but an optical head comprising finite optics that do not uses a collimator lens may be used. In that case, since the collimator lens is not used, the cost can be reduced correspondingly.

Figure 30:
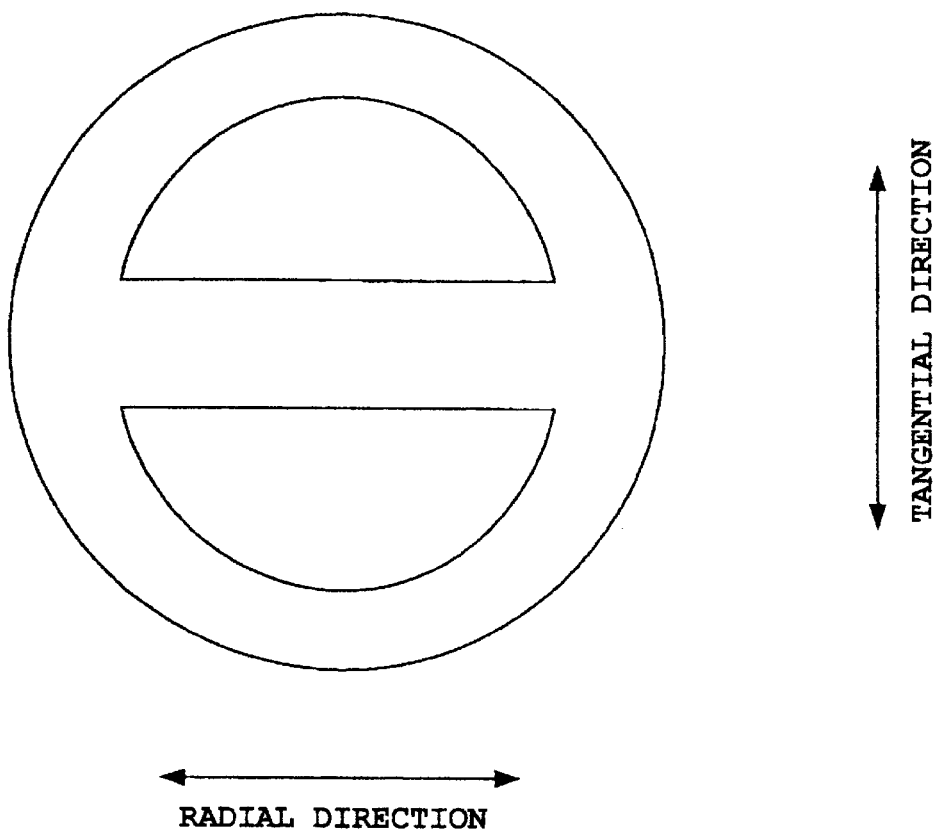
FIG. 30 is a diagram showing a pattern for correcting a wavefront aberration caused by tangential tilt, in the optical element of the present invention.
Figure 31:
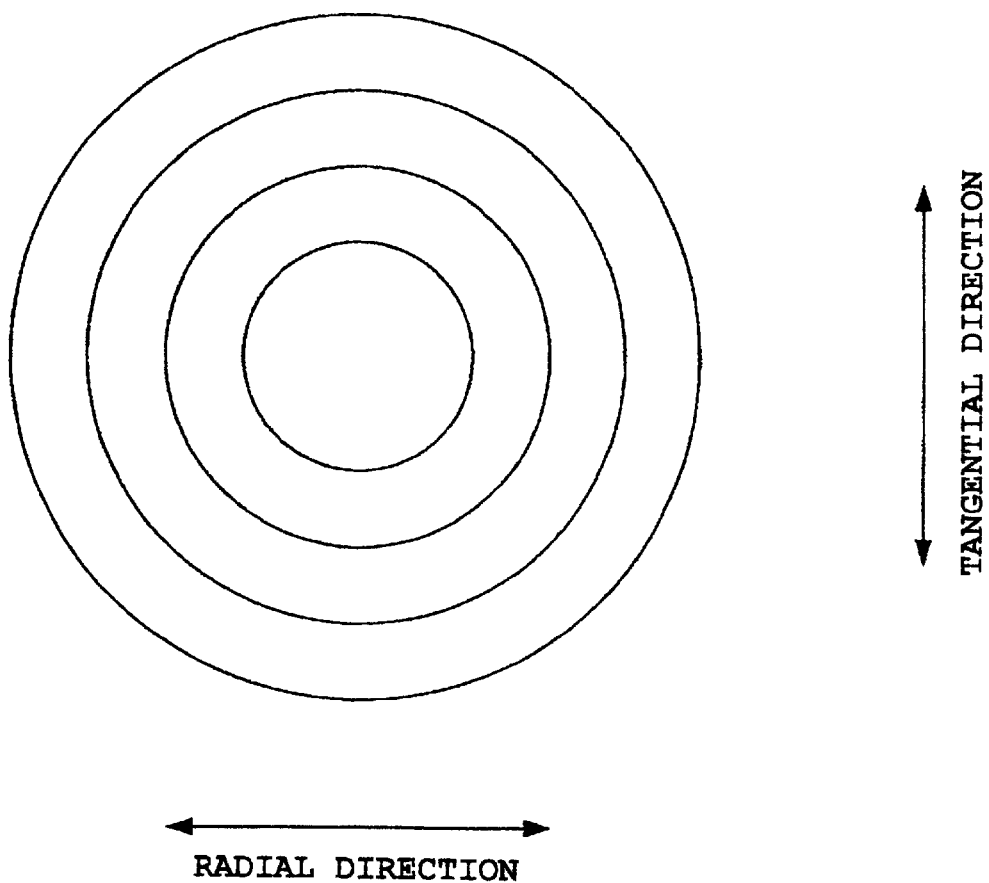
FIG. 31 is a diagram showing a pattern for correcting a wavefront aberration caused by variations in substrate thickness, in the optical element of the present invention.
Figure 32:
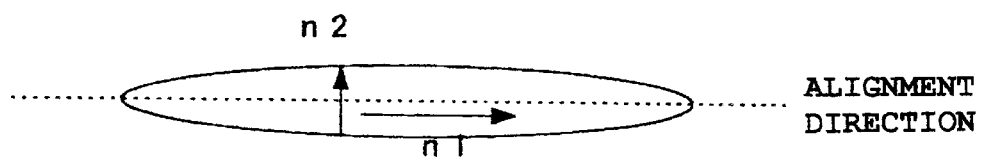
FIG. 32 is a diagram showing the alignment direction of liquid crystal in the prior art optical element.
Figure 33A:
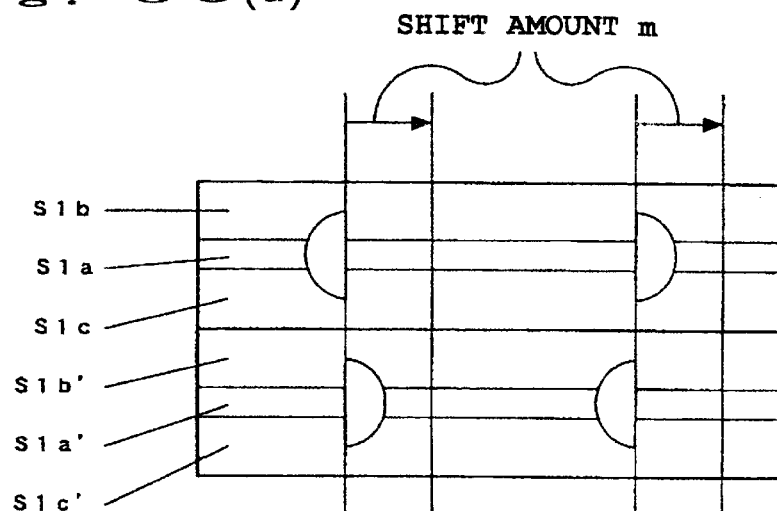
FIG. 33(a) is a diagram showing a light spot formed near the focal point on a photodetector in the well known SSD method, a focus detection method using an anisotropic polarizing hologram, according to the fifth embodiment.
Figure 33B:
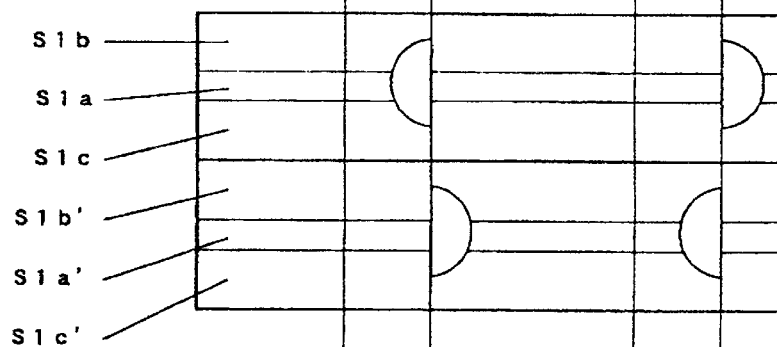
FIG. 33(b) is a diagram showing the case when there occurs a positional displacement in the light spot on the photodetector according to the fifth embodiment.
Figure 33C:
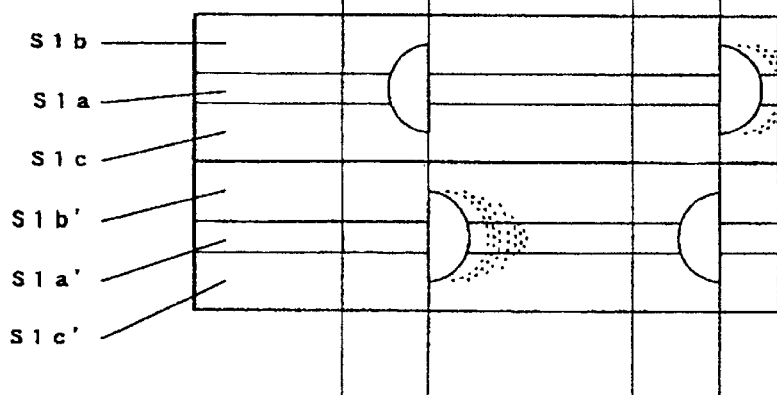
FIG. 33(c) is a diagram showing a light spot on the photodetector, illustrating the case where aberration correction cannot be done in the return path, according to the fifth embodiment.

Each of the above embodiments has been described as dealing with radial tilt, but by changing the electrode pattern, the wavefront aberration caused by tangential tilt (the electrode pattern shown in FIG. 30) or by variations in substrate thickness (the electrode pattern shown in FIG. 31) can be corrected in both the forward and return paths.

In the above embodiments, the separating means has been described as being constructed from the anisotropic polarizing hologram, but the polarizing optics may be constructed using, for example, a polarizing prism.

Furthermore, each of the above embodiments has been described dealing with the case where the optical recording medium is an optical disc, but the present invention can also be applied to an optical information recording/reproduction apparatus implementing similar functions, such as a card type optical recording medium.

The fifth and sixth embodiments shown in FIGS. 25 and 29 require the use of many liquid crystal layers and many glass layers, but if electrodes having void portions such as those described in the first to third embodiments or the fourth embodiment are used, not only one aberration but also a plurality of aberrations can be corrected simultaneously in both the forward and return paths.

In that case, the orientation of the alignment film for the liquid crystal must be varied in a mosaic pattern to match the arrangement of the electrode void portions.

In the above embodiments, tilt has been detected using a sensor while the optical recording medium is rotating; alternatively, the tilt may be detected and learned when the optical recording medium is mounted onto the apparatus.

As described above, according to the present invention, by forming a plurality of aberration correcting electrodes on the same side, an optical element thin in construction and capable of correcting a plurality of aberrations simultaneously can be implemented at low cost.

As described above, according to the present invention, when the optical element containing the first liquid crystal and the second liquid crystal oriented at right angles to the orientation of the first liquid crystal is used in the polarizing optical head, aberrations arising in the forward and return paths can be corrected, and servo signals with reduced offset can be obtained.

Furthermore, when the optical element of the present invention is used in the optical head, since aberrations can be corrected, the jitter margin, a measure of playback performance, increases and a high-performance optical head can be constructed.

What is claimed is:

1. An optical element comprising:
   a phase change layer for changing the phase of light passing therethrough;
   a plurality of aberration correcting electrodes, arranged on one side of said phase change layer, for correcting optical aberrations, each of said aberration correcting electrodes being split into a plurality of regions;

an insulating film interposed between said aberration correcting electrodes; and a specific electrode arranged on the other side of said phase change layer, and wherein:

said aberration correcting electrodes, at least other than the outermost aberration correcting electrode as viewed from said phase change layer, have openings formed in prescribed positions, and each of said aberration correcting electrodes, other than the innermost aberration correcting electrode, faces said phase change layer through said openings formed in other aberration correcting electrodes.

2. An optical element as set forth in claim 1, wherein said specific electrode is a counter electrode having a uniform electrode.

3. An optical element as set forth in claim 1, wherein said specific electrode is an aberration correcting electrode split into a plurality of regions.

4. An optical element as set forth in claim 1, wherein said specific electrode consists of a plurality of aberration correcting electrodes, each split into a plurality of regions.

5. An optical element as set forth in claim 1, wherein said insulating film is formed from a solgel film.

6. An optical element as set forth in claim 1, wherein said insulating film is formed from a material having substantially the same refractive index as said aberration correcting electrodes.

7. An optical element as set forth in claim 1, wherein said insulating film has a thickness equal to an integral multiple of $\lambda/(2 \times N(\text{insulating film}))$ (where $\lambda$ is the wavelength of light incident on said optical element, and $N(\text{insulating film})$ is the refractive index of said insulating film).

8. An optical element as set forth in claim 1, wherein said plurality of aberration correcting electrodes and said counter electrode are formed using the same electrically conductive material.

9. An optical element as set forth in claim 8, wherein said electrically conductive material is an Indium Tin Oxide alloy (ITO).

10. An optical element as set forth in claim 1, wherein said phase change layer is formed from a liquid crystal.

11. An optical element as set forth in claim 1, wherein said phase change layer is formed from a PLZT (transparent crystal having a perovskite structure of lead oxide, lanthanum, zirconium oxide, and titanium oxide).

12. An optical element as set forth in claim 1, wherein the refractive index of said phase change layer changes according to an externally applied signal.

13. An optical element as set forth in claim 1, wherein the thickness of said phase change layer changes according to an externally applied signal.

14. An optical element as set forth in claim 1, further comprising an antireflective film for preventing reflections of incident light.

15. An optical head for reproducing or recording information on an optical recording medium by means of light, comprising:

a light source; and an optical element including;

a phase change layer for changing the phase of light passing therethrough;

a plurality of aberration correcting electrodes, arranged on one side of said phase change layer, for correcting optical aberrations, each of said aberration correcting electrodes being split into a plurality of regions;

an insulating film interposed between said aberration correcting electrodes; and a specific electrode arranged on the other side of said phase change layer;

wherein;

said optical element is disposed in between said light source and said optical recording medium, and is capable of controlling the phase of incident light;

said aberration correcting electrodes of the optical element, at least other than the outermost aberration correcting electrode as viewed from said phase change layer, have openings formed in prescribed positions, and each of said aberration correcting electrodes, other than the innermost aberration correcting electrode, faces said phase change layer through said openings formed in other aberration correcting electrodes.

16. An optical head as set forth in claim 15, further comprising:

converging optics for focusing light emitted from said light source onto said optical recording medium, and for converging light reflected from said optical recording medium;

separating means for separating the light reflected from said optical recording medium away from the optical path of the light emitted from said light source; and a photodetector for outputting a focus error signal and a tracking error signal for said optical recording medium, as well as an information signal, by receiving the light reflected from said optical recording medium and separated by said separating means.

17. An optical head as set forth in claim 15, further comprising:

tilt detecting means for detecting a tilt in said optical recording medium, and wherein:

said optical element corrects a wavefront aberration caused by the tilt of said optical recording medium.

18. An optical head as set forth in claim 15, further comprising:

detecting means for detecting a tilt in said optical recording medium and the substrate thickness of said optical recording medium, and wherein:

said optical element corrects a wavefront aberration caused by the tilt of said optical recording medium and a wavefront aberration caused by variations in the substrate thickness of said optical recording medium.

19. An optical recording/reproduction apparatus comprising:

an optical head including;

a light source; and an optical element including;

a first aberration correcting electrode split into a plurality of regions;

a second aberration correcting electrode split into a plurality of regions;

a first counter electrode arranged substantially parallel to said first aberration correcting electrode;

a second counter electrode arranged substantially parallel to said second aberration correcting electrode;

a first phase change layer disposed between said first aberration correcting electrode and said first counter electrode; and a second phase change layer disposed between said aberration correcting electrode and said second counter electrode; and control circuitry to control said optical head based on signals output from said optical head and reproduce or record information on an optical recording medium;

wherein;
said optical element is disposed between said light source and said optical recording medium, and controls the phase of the light entering said optical element;
said first phase change layer changes the phase of linearly polarized light polarized in a prescribed polarization direction, and
said second phase change layer changes the phase of linearly polarized light polarized at right angles to the linearly polarized light polarized in said prescribed polarization direction.

20. The optical recording/reproduction apparatus of claim 19, further comprising:
a K-quarter wave plate (where K is an odd number) disposed between the optical element and the optical recording medium, the K-quarter wave plate having an optical axis oriented at 45 degrees to the prescribed polarization direction;
wherein the light source produces linearly polarized light polarized in the prescribed polarization direction.

21. An optical element comprising:
a first aberration correcting electrode split into a plurality of regions;
a second aberration correcting electrode split into a plurality of regions;
a first counter electrode arranged substantially parallel to said first aberration correcting electrode;
a second counter electrode arranged substantially parallel to said second aberration correcting electrode;
a first phase change layer disposed between said first aberration correcting electrode and said first counter electrode; and
a second phase change layer disposed between said aberration correcting electrode and said second counter electrode;
wherein;
said first phase change layer changes the phase of linearly polarized light polarized in a prescribed polarization direction, and
said second phase change layer changes the phase of linearly polarized light polarized at right angles to the linearly polarized light polarized in said prescribed polarization direction.

22. An optical element as set forth in claim 21, wherein said first and/or second phase change layers are liquid crystal layers, and said prescribed direction is the orientation direction of an alignment film.

23. An optical element as set forth in claim 21, wherein said first and second aberration correcting electrodes and said first and second counter electrodes are formed using the same electrically conductive material.

24. An optical element as set forth in claim 23, wherein said electrically conductive material is an Indium Tin Oxide alloy (ITO).

25. An optical element as set forth in claim 22, wherein the refractive index of each of said first and second liquid crystal layers changes according to an externally applied control voltage signal.

26. An optical element as set forth in claim 21, wherein said first and second aberration correcting electrodes have the same split region pattern.

27. An optical element as set forth in claim 21, further comprising an antireflective film for preventing reflections of incident light.

28. An optical head for reproducing or recording information on an optical recording medium by means of light, comprising:
a light source; and
an optical element including;
a first aberration correcting electrode split into a plurality of regions;
a second aberration correcting electrode split into a plurality or regions;
a first counter electrode arranged substantially parallel to said first aberration correcting electrode;
a second counter electrode arranged substantially parallel to said second aberration correcting electrode;
a first phase change layer disposed between said first aberration correcting electrode and said first counter electrode; and
a second phase change layer disposed between said aberration correcting electrode and said second counter electrode;
wherein;
said optical element is disposed between said light source and said optical recording medium, and controls the phase of the light entering said optical element;
said first phase change layer changes the phase of linearly polarized light polarized in a prescribed polarization direction, and
said second phase change layer changes the phase of linearly polarized light polarized at right angles to the linearly polarized light polarized in said prescribed polarization direction.

29. An optical head as set forth in claim 28, further comprising:
a K-quarter wave plate (where K is an odd number) for changing a polarization state of the light emitted from said light source.

30. An optical head as set forth in claim 28, wherein said optical element corrects a wavefront aberration caused by the angle of tilt of said optical recording medium.

31. An optical recording/reproduction apparatus comprising:
an optical head including;
a light source; and
an optical element including;
a phase change layer for changing the phase of light passing therethrough;
a plurality of aberration correcting electrodes, arranged on one side of said phase change layer, for correcting optical aberrations, each of said aberration correcting electrodes being split into a plurality of regions;
an insulating film interposed between said aberration correcting electrodes; and
a specific electrode arranged on the other side of said phase change layer; and
control circuitry to control said optical head based on signals output from said optical head and reproduce or record information on said optical recording medium;
wherein;
said optical element of the optical head is disposed in between said light source and said optical recording medium, and is capable of controlling the phase of incident light;
said aberration correcting electrodes of the optical element, at least other than the outermost aberration correcting electrode as viewed from said phase change layer, have openings formed in prescribed positions; and
each of said aberration correcting electrodes, other than the innermost aberration correcting electrode, faces said phase change layer through said openings formed in other aberration correcting electrodes.

* * * * *